United States Patent
Ueda et al.

(10) Patent No.: US 8,700,091 B2
(45) Date of Patent: Apr. 15, 2014

(54) DATA TRANSMISSION DEVICE, DATA TRANSMISSION METHOD, DATA COMMUNICATION SYSTEM, PROGRAM, AND RECORDING MEDIUM

(75) Inventors: Toru Ueda, Osaka (JP); Junichi Shirakawa, Osaka (JP); Nobuo Kusumoto, Osaka (JP); Syuji Daioku, Osaka (JP); Azusa Umemoto, Osaka (JP); Akira Tojima, Osaka (JP); Takehiko Shioda, Kawasaki (JP); Akihiro Tozaki, Kawasaki (JP); Kunihiro Minoshima, Kawasaki (JP); Kazunori Hashimoto, Kawasaki (JP)

(73) Assignees: Sharp Kabushiki Kaisha, Osaka (JP); Pioneer Corporation, Kanagawa (JP)

( * ) Notice: Subject to any disclaimer, the term of this patent is extended or adjusted under 35 U.S.C. 154(b) by 550 days.

(21) Appl. No.: 13/120,748

(22) PCT Filed: Sep. 3, 2009

(86) PCT No.: PCT/JP2009/065442
§ 371 (c)(1),
(2), (4) Date: May 2, 2011

(87) PCT Pub. No.: WO2010/035620
PCT Pub. Date: Apr. 1, 2010

(65) Prior Publication Data
US 2011/0205153 A1    Aug. 25, 2011

(30) Foreign Application Priority Data
Sep. 26, 2008    (JP) ................. 2008-249012

(51) Int. Cl.
*G09G 5/00*    (2006.01)
*H04N 7/14*    (2006.01)

(52) U.S. Cl.
USPC .......................... 455/557; 345/156; 348/14.02

(58) Field of Classification Search
USPC ............... 345/156, 634; 340/12.23; 709/219; 455/458, 466; 348/14.02
See application file for complete search history.

(56) References Cited

U.S. PATENT DOCUMENTS 6,359,837 B1    3/2002    Tsukamoto
7,953,824 B2 *  5/2011    Rhoads et al. ................ 709/219

(Continued)

FOREIGN PATENT DOCUMENTS

JP    2002-98543 A    4/2002
JP    2003-228539 A    8/2003

(Continued)

OTHER PUBLICATIONS

International Search Report PCT/JP2009/065442 dated Oct. 13, 2009.

*Primary Examiner* — Nizar Sivji
(74) *Attorney, Agent, or Firm* — Birch, Stewart, Kolasch & Birch, LLP

(57) ABSTRACT

A mobile phone (1) in accordance with the present invention includes: a transmission setting database (50); a transmission setting section (21) for registering, on the transmission setting database (50), a piece of image data to be transmitted to a data receiving device; and an image data transmitting section (12) for transmitting, to the data receiving device, the piece of image data registered on the transmission setting database (50), the image data transmitting section (12) transmitting the piece of image data to the data receiving device in response to a transmission request received from the data receiving device. Therefore, according to a data transmission device in accordance with the present invention, it is possible to transmit a desired piece of additional-information-containing data to the data receiving device without forcing a user to again carry out operation of transmitting the piece of additional-information-containing data to the data receiving device, even in a case where the user cannot transmit the desired piece of additional-information-containing data to the data receiving device.

18 Claims, 15 Drawing Sheets

(56) References Cited

U.S. PATENT DOCUMENTS

2004/0109063 A1  6/2004  Kusaka et al.
2007/0296739 A1* 12/2007  Lonn ............................. 345/634

FOREIGN PATENT DOCUMENTS

| | | |
|---|---|---|
| JP | 2003-315078 A | 11/2003 |
| JP | 2003-345701 A | 12/2003 |
| JP | 2001-103409 A | 4/2004 |
| JP | 2004-208317 A | 7/2004 |
| JP | 2004-229244 A | 8/2004 |
| JP | 2007-334696 A | 12/2007 |
| JP | 2008-108151 A | 5/2008 |
| JP | 2009-8392 A | 1/2009 |
| WO | WO 2007/043572 A1 | 4/2007 |

* cited by examiner

FIG. 5

Transmission time period

Year 2008  Month 7  Date 19
     Hour 00  Minute 00

~

Year 2008  Month 7  Date 19
     Hour 23  Minute 59

Transmission method

BT ▽    Set

FIG. 7

| Time at which transmission scheduling is accepted | Transmission time period | Image data | Communication method |
|---|---|---|---|
| ... | ... | ... | ... |
| 2008/10/25 9:00:05 | (none specified) | A.jpg | BT |
| 2008/10/25 9:30:05 | 2008/10/30 10:00:00~19:00:00 | B.jpg | IC., IEEE802.11 |
| ... | ... | ... | ... |

DATA TRANSMISSION DEVICE, DATA TRANSMISSION METHOD, DATA COMMUNICATION SYSTEM, PROGRAM, AND RECORDING MEDIUM

TECHNICAL FIELD

The present invention relates to a data transmission device, a data transmission method, and a data communication system, each of which transmits, to a data receiving device, a piece of additional-information-containing data in which a piece of process specifying information for causing the data receiving device to carry out a process is stored.

BACKGROUND ART

In recent years, a digital camera, especially a mobile phone with a digital camera function, has been in widespread use. Along with the widespread of the digital camera, devices such as (i) a television device for displaying image data obtained from the digital camera or the mobile phone and (ii) a printer for printing out an obtained image data have also been in widespread use. Further, a technique in which image data is exchanged between such devices via a wireless communication has been also in widespread use.

Generally-known protocols in conformity with which the image data is transmitted via a wireless communication are for example: a high-speed infrared communication protocol such as IrSimple®; a short-distance wireless communication protocol such as Bluetooth®, and the like. With such wireless communications, it is possible to easily cause the television etc. to display a photograph taken by the mobile phone or the like.

Recently, not only a communication network via the Internet but also a network between a plurality of devices have been supported. Specifically, it has been possible to cause the plurality of devices on the network to operate in cooperation with each other via a communication between the plurality of devices. Such a cooperative operation is achieved by for example a method of connecting image devices via HDMI (High-definition Multimedia Interface) so that the image devices exchange operation signals.

Besides the cooperative operation via wires using the HDMI etc., there have been proposed other cooperative operations in which a PDA (Personal Data Assistant) or the mobile phone etc. is used as a remote controller so as to carry out remote control via a short-distance wireless communication such as Bluetooth®, infrared communication, Zigbee®, or UWB (ultra wideband). As a method for achieving such cooperative operations, there have been known not only (i) a method of directly transmitting and receiving a command but also (ii) a method of storing the command etc. into a file and then transmitting the file.

With the developments of such communication techniques, in recent years, there have been proposed a method of (i) making a desired setting on the mobile phone, PDA, PC, or the like and then (ii) transmitting the setting to a device to be controlled.

For example, Patent Literature 1 discloses a technique of (i) storing position information such as telephone number information into a HTML file and then (ii) transmitting the HTML file containing the position information to a navigation device. The navigation device can extract the telephone number information contained in the received HTML file, and carry out a destination setting or a point registration on the basis of the telephone number information.

However, such a short-distance wireless communication is generally carried out only when necessary in accordance with a user's instruction. Therefore, in order to establish the wireless communication, the user is forced to carry out complicated operations such as activating a communication device and making communication settings.

Patent Literature 2 discloses a technique of saving a user from having to carry out complicated operations in such a manner that a server and a client, which support a short-distance wireless communication, start communicating upon detecting a state in which they are in a range where they can communicate with each other.

CITATION LIST

Patent Literatures

Patent Literature 1
Japanese Patent Application Publication, Tokukai, No. 2003-315078 A (Publication Date: Nov. 6, 2003)
Patent Literature 2
Japanese Patent Application Publication, Tokukai, No. 2002-98543 A (Publication Date: Apr. 5, 2002)

SUMMARY OF INVENTION

Technical Problem

The following description discusses how data communication is carried out between a plurality of devices for example in a case where a mobile phone transmits information to a car navigation system. The car navigation system is activated generally by starting an engine of a car in which the car navigation system is installed (or of a car to which the car navigation system is connected). Therefore, needless to say, the car navigation system is in an OFF state while the engine of the car is in the OFF state. The car navigation system in the OFF state does not communicate with another device (e.g., mobile phone). If a user wants to cause the car navigation system and the mobile phone to operate in cooperation with each other under such a condition, the user needs to activate the car navigation system so that the car navigation system is in a state where it can communicate with the mobile phone, and then operate the mobile phone so as to transmit, to the car navigation system, information for causing the mobile phone and the car navigation system to operate in cooperation with each other. Under such circumstances, for example, particularly in a case where the user wants to quickly start driving the car, the user often forgets to carry out the operation on the mobile phone.

Even if the user found out, after started driving the car, that he/she had to transmit the information to the car navigation system like above, the user must not to operate the mobile phone so as to transmit the information to the car navigation system while driving for traffic safety. Therefore, the user has to once stop (park) the car in order to operate the mobile phone so as to transmit the information to the car navigation system.

On the other hand, according to the technique described in Patent Literature 2, the client transmits predetermined data (identification information) to the server at a time when the server and the client, which communicate with each other via the short-distance wireless communication, has entered a range where they can communicate with each other. Therefore, the technique causes a problem in which the client cannot prepare data to be transmitted as needed.

The present invention has been made in view of the problem, and a main object of the present invention is to provide a data transmission device capable of transmitting data containing additional information (such data is hereinafter referred to as additional-information-containing data) that a user wants to transmit.

Solution to Problem

In order to attain the above object, a data transmission device in accordance with the present invention is a data transmission device for transmitting a piece of additional-information-containing data in which pieces of process specifying information for causing a data receiving device to carry out a specified process are stored, said data transmission device, including: a transmission setting management section; transmission setting means for registering, on the transmission setting management section, a piece of additional-information-containing data to be transmitted to the data receiving device; and transmitting means for transmitting, to the data receiving device, the piece of additional-information-containing data registered on the transmission setting management section, the transmitting means transmitting the piece of additional-information-containing data to the data receiving device (i) in response to a transmission request received from the data receiving device or (ii) at a time when a communication is established between the data transmission device and the data receiving device.

According to the data transmission device in accordance with the present invention, the piece of additional-information-containing data to be transmitted to the data receiving device is registered on the transmission setting management section in advance. Then, the piece of additional-information-containing data registered on the transmission setting management section is transmitted (i) in response to the transmission request from the data receiving device or (ii) at the time when the communication is established between the data transmission device and the data receiving device.

This makes it possible to transmit a variety of pieces of additional-information-containing data to the data receiving device, by changing the pieces of additional-information-containing data registered on the transmission setting management section. Therefore, according to the data transmission device in accordance with the present invention, even in a case where a user cannot transmit a desired piece of additional-information-containing data to the data receiving device, it is possible to transmit the desired piece of additional-information-containing data to the data receiving device without forcing the user to again carry out the operation of transmitting the desired piece of the additional-information-containing data to the data receiving device.

Further, the data transmission device in accordance with the present invention is preferably configured such that, after the piece of additional-information-containing data is transmitted to the data receiving device, the transmission setting means (i) deletes, from the transmission setting management section, the piece of additional-information-containing data which has been transmitted or (ii) registers information, indicating that the piece of additional-information-containing data has been transmitted, on the transmission setting management section such that the information is associated with the piece of additional-information-containing data which has been transmitted.

This configuration makes it possible to prevent the same piece of additional-information-containing data from being again transmitted.

Further, it is preferable that a data transmission device in accordance with the present invention further include: determining means for determining whether or not it is possible to transmit a piece of additional-information-containing data to the data receiving device, the transmission setting means registering the piece of additional-information-containing data on the transmission setting management section if it is determined by the determining means that it is not possible to transmit the piece of additional-information-containing data to the data receiving device.

According to the configuration, the data transmission device automatically (i) transmits the piece of additional-information-containing data immediately if it is determined by the determining means that it is possible to transmit the piece of additional-information-containing data and (ii) makes a setting so that the piece of additional-information-containing data will be transmitted later if it is determined by the determining means that it is not possible to transmit the piece of additional-information-containing data. This makes it possible to save the user the trouble of making a transmission setting.

Further, it is preferable that a data transmission device in accordance with the present invention further include: a display section; determining means for determining whether or not it is possible to transmit a piece of additional-information-containing data to the data receiving device; item setting means for setting an item to be displayed on the display section; and display controlling means for controlling the display section to display the item set by the item setting means, the item set by the item setting means being, (i) in a case where it is determined by the determining means that it is possible to transmit the piece of additional-information-containing data to the data receiving device, at least one of (a) an item for causing the piece of additional-information-containing data to be immediately transmitted and (b) an item for causing the piece of additional-information-containing data to be registered on the transmission setting management section or (ii) in a case where it is determined by the determining means that it is not possible to transmit the piece of additional-information-containing data to the data receiving device, the item for causing the piece of additional-information-containing data to be registered on the transmission setting management section.

According to the configuration, the item to be displayed on the display section can be set according to whether or not it is possible to transmit the piece of additional-information-containing data to the data receiving device. That is, it is possible to expressly notify the user that which process can be carried out at present.

This reduces the number of operations, of the data transmission device, required for transmitting the piece of additional-information-containing data, and thus makes it possible to save the user from having to carrying out many operations so as to transmit the piece of additional-information-containing data.

Further, the data transmission device in accordance with the present invention is preferably configured such that: the transmission setting means registers, on the transmission setting management section, the piece of additional-information-containing data such that the piece of additional-information-containing data is associated with a transmission time period of the piece of additional-information-containing data; and the piece of additional-information-containing data which is transmitted by the transmitting means to the data receiving device is registered on the transmission setting management section so as to be associated with the transmission time period including a time when the transmission request is received or a time when a communication is established between the data transmission device and the data receiving device.

According to the configuration, it is possible to transmit, with reference to the transmission setting management section, the piece of additional-information-containing data (i) in response to the transmission request, for transmitting the piece of additional-information-containing data, which is received from the data receiving device in the case where the data transmission device receives the transmission request during the transmission time period during which the piece of additional-information-containing data is to be transmitted or (ii) at the time when the communication is established between the data transmission device and the data receiving device in the case where the communication is established between the data transmission device and the data receiving device during the transmission time period during which the piece of additional-information-containing data is to be transmitted. In other words, according to the data transmission device in accordance with the present invention, it is possible to transmit the piece of additional-information-containing data during a user's desired time period in a case where (a) the transmission request from the data receiving device is received during the user's desired time period or (ii) the communication is established between the data transmission device and the data receiving device during the user's desired time period, i.e., a communication is established between the data transmission device and the data receiving device during the user's desired time period.

Further, the data transmission device in accordance with the present invention is preferably configured such that: the transmission setting means registers, on the transmission setting management section, the piece of additional-information-containing data such that the piece of additional-information-containing data is further associated with a transmission medium via which the piece of additional-information-containing data is to be transmitted; and the transmitting means transmits the piece of additional-information-containing data via the transmission medium associated with the piece of additional-information-containing data.

According to the configuration, it is possible to set in advance the transmission medium (in other words, a protocol) via which the piece of additional-information-containing data is to be transmitted to the data receiving device. This makes it possible, in a case where a plurality of transmission media are available for transmission of the piece of additional-information-containing data, to transmit the piece of additional-information-containing data via a user's preferred one of the plurality of transmission media.

Further, the data transmission device in accordance with the present invention is preferably configured such that the transmission setting means determines, in accordance with the pieces of process specifying information stored in the piece of additional-information-containing data, the transmission medium registered on the transmission setting management section so as to be associated with the piece of additional-information-containing data.

According to the configuration, the data transmission device automatically determines, in accordance with the type of the piece of process specifying information stored in the additional-information-containing data, the transmission medium via which the piece of additional-information-containing data is to be transmitted. That is, the data transmission device makes a setting so that, in a case where the piece of additional-information-containing data is to be transmitted to a predetermined data receiving device, the piece of additional-information-containing data is transmitted via a predetermined transmission medium.

This saves the user the trouble of selecting a transmission medium every time the user carries out an operation for registering the transmission setting of the piece of additional-information-containing data, and thus makes it possible to simplify the registration of the transmission setting.

Further, this makes it possible to prevent failure of the transmission of the piece of additional-information-containing data, which failure occurs because the data receiving device is not capable of receiving data via the transmission medium registered so as to be associated with the piece of additional-information-containing data.

Further, the data transmission device in accordance with the present invention is preferably configured such that, in a case where (i) a first transmission time period of a first one of the pieces of additional-information-containing data which has been registered on the transmission setting management section and (ii) a second transmission time period of a second one of the pieces of additional-information-containing data which is intended to be registered on the transmission setting management section, overlap each other, the transmission setting means registers the first and second ones of the pieces of additional-information-containing data such that the first and second ones of the pieces of additional-information-containing data are associated with their orders in which they are transmitted.

According to the configuration, it is possible to set the order in which the pieces of additional-information-containing data whose transmission time periods overlap each other are transmitted. This makes it possible to transmit the pieces of additional-information-containing data to the data receiving device in the user's desired order, even in the case where the transmission time periods registered in the transmission setting management section overlap each other.

Further, it is preferable that a data transmission device in accordance with the present invention further include: a data storage section; and additional-information-containing data receiving means for receiving a piece of additional-information-containing data and for storing received pieces of additional-information-containing data in the data storage section, the transmission setting means registering, as the piece of additional-information-containing data to be transmitted to the data receiving device, a selected one of the pieces of additional-information-containing data stored in the data storage section on the transmission setting management section.

The configuration makes it possible, even in a case of a piece of additional-information-containing data obtained from an external device, to carry out the transmission setting of an obtained piece of additional-information-containing data.

Further, it is preferable that a data transmission device in accordance with the present invention further include: a display section; process item setting means for setting, in accordance with a type of each of the pieces of process specifying information stored in the piece of additional-information-containing data, an item which the data transmission device can process; and display controlling means for controlling the display section to display the item set by the process item setting means.

According to the configuration, it is possible to control the display section to display the item which the data transmission device can process, depending on the type of the piece of process specifying information stored in the piece of additional-information-containing data. That is, according to the data transmission device in accordance with the present invention, it is possible to present to the user only an item indicating a process that can be carried out by the data transmission device.

Further, the data transmission device in accordance with the present invention is preferably configured such that the piece of additional-information-containing data is a piece of image data which stores a piece of process specifying information with a parameter, the piece of process specifying information causing the data receiving device to carry out a specified process.

Further, it is preferable that a data transmission device in accordance with the present invention further include: a display section; and display controlling means for controlling the display section to display the piece of additional-information-containing data, the display controlling means controlling the display section to display a piece of additional-information-containing data on which a piece of identification information, indicating that the piece of additional-information-containing data stores its piece of process specifying information, is superimposed.

According to the configuration, the user can easily recognize whether or not the piece of additional-information-containing data displayed on the display section stores the piece of process specifying information.

Further, the data transmission device in accordance with the present invention is preferably configured such that the piece of identification information varies depending on a type of the piece of process specifying information.

According to the configuration, the user can easily recognize what kind of process specifying information is stored in the piece of additional-information-containing data displayed on the display section.

Further, the data transmission device in accordance with the present invention is preferably configured such that: the data receiving device is a car navigation system; and the parameter causes the car navigation system to carry out a specified process that can be carried out by the car navigation system.

Further, the data transmission device in accordance with the present invention is preferably configured such that the parameter is a parameter which causes the car navigation system to (i) search for a route to a target point or (ii) register the target point.

In order to attain the above object, a data communication system in accordance with the present invention includes: a data receiving device for receiving a piece of additional-information-containing data in which pieces of process specifying information for causing a specified process to be carried out are stored; and a data transmission device for transmitting the piece of additional-information-containing data to the data receiving device, the data transmission device including: a transmission setting management section; transmission setting means for registering, on the transmission setting management section, the piece of additional-information-containing data to be transmitted to the data receiving device; and transmitting means for transmitting, to the data receiving device, the piece of additional-information-containing data registered on the transmission setting management section, the transmitting means transmitting the piece of additional-information-containing data to the data receiving device (i) in response to a transmission request received from the data receiving device or (ii) at a time when a communication is established between the data transmission device and the data receiving device, and the data receiving device including: transmission request transmitting means for transmitting, to the data transmission device, the transmission request for requesting the data transmission device to transmit the piece of additional-information-containing data; receiving means for receiving the piece of additional-information-containing data transmitted from the data transmission device which has received the transmission request; and means for carrying out a process in accordance with the pieces of process specifying information stored in the piece of additional-information-containing data.

The configuration achieves a same working effect as that of the data transmission device in accordance with the present invention.

Further, the data communication system in accordance with the present invention is preferably configured such that: the data transmission device is a portable information terminal; and the data receiving device is a car navigation system.

In order to attain the above object, a data transmission method in accordance with the present invention is a method for use in a data transmission device for transmitting a piece of additional-information-containing data in which pieces of process specifying information for causing a data receiving device to carry out a specified process are stored, said data transmission method, comprising the steps of: registering, on a transmission setting management section, a piece of additional-information-containing data to be transmitted to the data receiving device; and transmitting, to the data receiving device, the piece of additional-information-containing data registered on the transmission setting management section, in the transmitting, the piece of additional-information-containing data being transmitted to the data receiving device (i) in response to a transmission request received from the data receiving device or (ii) at a time when a communication is established between the data transmission device and the data receiving device.

The configuration achieves a same working effect as that of the data transmission device in accordance with the present invention.

Further, the present invention also encompasses (i) a program for causing a computer included in the data transmission device in accordance with the present invention to operate, which program causes the computer to function as the means as recited in the data transmission device and (ii) a computer-readable recording medium in which the program is stored.

Advantageous Effects of Invention

As has been described, a data transmission device in accordance with the present invention registers, on a transmission setting management section, a piece of additional-information-containing data to be transmitted to a data receiving device, and transmits the piece of additional-information-containing data registered on the transmission setting management section (i) in response to a transmission request from the data receiving device or (ii) at a time when a communication is established between the data transmission device and the data receiving device.

Therefore, according to the data transmission device in accordance with the present invention, even in a case where a user cannot transmit a desired piece of additional-information-containing data to the data receiving device, it is possible to transmit the desired piece of additional-information-containing data to the data receiving device without forcing the user to again carry out the operation of transmitting the desired piece of the additional-information-containing data to the data receiving device.

BRIEF DESCRIPTION OF DRAWINGS

FIG. 5 is a view illustrating one example of a transmission setting screen for a piece of image data.

FIG. 7 is one example of a management table containing pieces of image data, respective corresponding transmission time periods, and respective corresponding transmission media, which are associated with one another.

DESCRIPTION OF EMBODIMENTS

One embodiment of a data transmission device in accordance with the present invention is described below with reference to FIGS. 1 through 11. The present embodiment describes with an example in which the data transmission device is a mobile phone. Needless to say, the data transmission device is not limited to the mobile phone, and therefore can be any other device provided that the data transmission device is capable of transmitting data containing additional information (such data is hereinafter referred to as additional-information-containing data).

Further, the present embodiment describes with an example in which a piece of additional-information-containing data with a parameter transmitted by the data transmission device is a piece of image data in which a piece of process specifying information is stored. The parameter causes the data receiving device, which receives the piece of image data, to carry out a specified process. Prior to the specific description of the data transmission device of the present embodiment, the following description discusses in detail the piece of image data which is one of the piece of additional-information-containing data transmitted by the data transmission device.

(Image Data 3)

Figure 2:
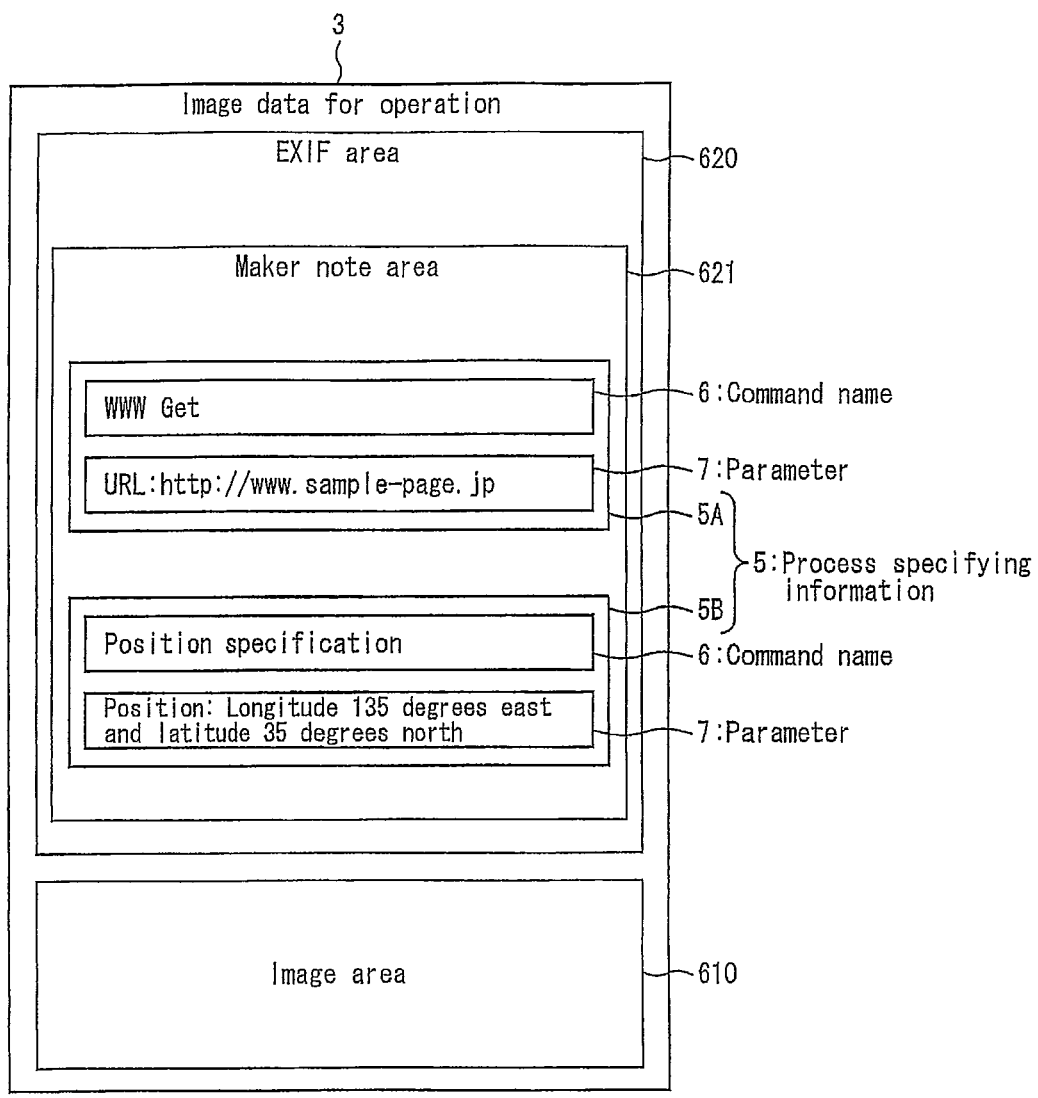
FIG. 2 is a view schematically illustrating a structure of a piece of image data generated by an image data generation device in accordance with the present invention.

FIG. 2 illustrates a structure of a piece of image data to be transmitted by the data transmission device in accordance with the present invention. FIG. 2 is a view schematically illustrating a structure of a piece of image data 3. As illustrated in FIG. 2, the piece of image data 3 is schematically a piece of JPEG image data having an image area 610 and an EXIF area 620.

(Image Area 610 and EXIF Area 620)

The image area 610 stores a compressed image such as a photograph. The EXIF area 620 stores mainly metadata regarding the image stored in the image area 610.

The EXIF area 620 includes a maker note area 621, which a distributor distributing the piece of image data 3 can use by freely specifying specifications. A plurality of pieces of process specifying information 5 can be stored in the maker note area 621. It is not particularly limited as to where in the maker note area 621 the plurality of pieces of process specifying information 5 are stored. Note that, according to an example of FIG. 2, two pieces of process specifying information 5 (a piece of process specifying information 5A and a piece of process specifying information 5B) are stored.

Note that it is also possible to store, in the image area 610, an image representing a process specified by a corresponding one of the plurality of pieces of process specifying information 5 stored in the maker note area 621. This allows a user to recognize what kind of process can be carried out by an image data reception processing device (data processing device) that has received the piece of image data 3 when the piece of image data 3 is displayed on a display section of a data transmission device 1. As such, it becomes possible for the user to determine whether or not to transmit the piece of image data 3 to the image data reception processing device.

(Process Specifying Information 5)

Each of the plurality of pieces of process specifying information 5 includes a command name 6 and a parameter 7. The command name 6 is a name of a command specifying a process which should be carried out by the image data reception processing device. The parameter 7 is a parameter of the command. Note that the parameter 7 can be omitted depending on the command. Note also that the command name 6 can be replaced by an identifiable code.

According to the process specifying information 5A of the example shown in FIG. 2, the command name 6 is "WWW Get" and the parameter 7 is "URL: http://www.sample-page.jp". The process specifying information 5A is a command to obtain a Web page, on an HTTP server, which is indicated by the URL (Uniform Resource Locator) specified by the parameter 7. According to the process specifying information 5B, the command name 6 is "Position Specification" and the parameter 7 is "Position: longitude 135 degrees east and latitude 35 degrees north". The process specifying information 5B is a command to carry out a process such as navigation or route search based on the position specified by the longitude and latitude specified by the parameter 7.

The "WWW Get" command can be executed by a device, such as a television, a PC, or a mobile phone, that has a Web function. Upon reception of the "WWW Get" command, the device obtains the Web page, on the HTTP server, which is indicated by the URL specified by the parameter 7, and then controls a display section to display the Web page. The "Position Specification" command is a command that can be executed by a device, such as a car navigation system, which uses position information. Upon reception of the "Position Specification" command, the car navigation system starts navigation after setting, as a destination, the position specified by the parameter 7, for example Specifically, for example in a case where the piece of image data 3 is supplied to the television, the television executes the "WWW Get" command that the television can execute. Then, the television obtains information such as tourist information from a location, on the HTTP server, which is indicated by the URL specified by the parameter corresponding to the "WWW Get" command, and displays the information. The television does not carry out a process specified by the "Position Specification" command. Note however that, in a case where a television can carry out processes such as displaying a map in response to the "Position Specification" command or searching for information regarding a specified position, such a television exceptionally carries out the process specified by the "Position Specification" command.

On the other hand, in a case where the piece of image data 3 is supplied to the car navigation system, the car navigation system carries out only a process specified by the "Position Specification" command that the car navigation system can execute. For example, the car navigation system carries out navigation or route search in which the position specified by the parameter 7 of the "Position Specification" command is set as a destination. Alternatively, the car navigation system registers, on a memory of the car navigation system, the position specified by the parameter 7 of the "Position Specification" command. The car navigation system does not execute the "WWW Get" command. Note, however, that in a case where the car navigation system is configured so as to (i) include communication means, (ii) be capable of displaying an HTML file, and (iii) access the HTTP server which is indicated by the URL specified by the "WWW Get" command, the car navigation system exceptionally executes the "WWW Get" command.

Needless to say, in a case where the image data reception processing device is capable of handling any of the plurality of pieces of process specifying information stored in the process specifying information 5, the image data reception processing device can execute the any of them. In such a case, the image data reception processing device should display a screen prompting a user to select which one of the available plurality of pieces of process specifying information should be to executed. The image data reception processing device carries out a process selected by the user.

Note here that the number of pieces of process specifying information 5 executed is not limited to one (1), and therefore two or more of the pieces of process specifying information can be simultaneously executed. For example, in a case where the image data reception processing device is a PC or a television which has a Web function and is capable of displaying a map, it is possible to (i) divide a display screen into two display screens and (ii) display an obtained Web page on one of the two display screens whereas a map of the position specified by the position information on the other one of the two display screens. In a case where the image data reception processing device has a PinP function, it is possible to display either one of the obtained Web page and the map on a main screen and to display the other on a sub screen.

Although FIG. 2 shows an example in which the command name 6 of the process specifying information 5A is different from that of the process specifying information 5B, identical command names 6 can be used as the process specifying information 5A and the process specifying information 5B. For example, each of the command name 6 of the process specifying information 5A and the command name 6 of the process specifying information 5B can be the "WWW Get", and the parameter 7 of the process specifying information 5A and the parameter 7 of the process specifying information 5B can specify different URLs. In such a case, if the process specifying information 5A and the process specifying information 5B are simultaneously executed, then Web pages specified by the respective different URLs are displayed. Alternatively, for example in a case where each of the command name 6 of the process specifying information 5A and the command name 6 of the process specifying information 5B is the "Position Specification", the route is searched and presented in which one of a plurality of specified positions is set as a destination which is reached via another one of the plurality of specified positions.

Although FIG. 2 illustrates the piece of image data 3 containing the two pieces of process specifying information 5, it is needless to say that the number of the pieces of process specifying information 5 is not limited to two. The number of the pieces of process specifying information 5 contained in the piece of image data 3 can be three or more or only one (1). Further, although the present embodiment describes with an example in which a piece of image data which stores a piece of process specifying information 5 is a piece of JPEG image data, the piece of image data is not limited to the piece of JPEG image data, provided that the piece of image data can store the process specifying information 5.

Note in the Description etc. that, unless otherwise stated, the "image data" means image data has a data structure as illustrated in FIG. 2 (i.e., image data in which process specifying information 5 is stored).

(Configuration of Mobile Phone 1)

Figure 1:
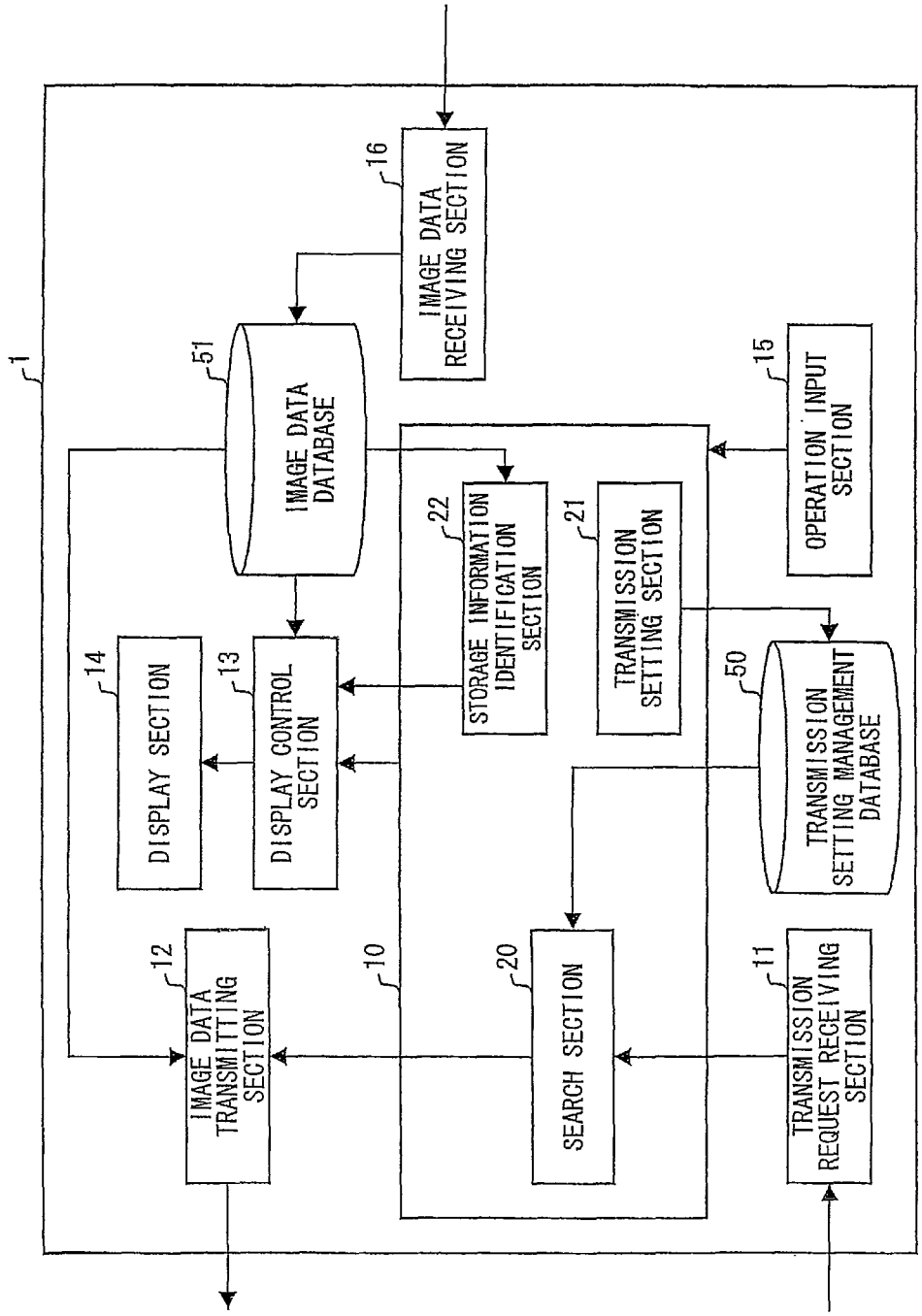
FIG. 1 is a block diagram illustrating how a main part of a mobile phone in accordance with the present invention is configured.

The following description discusses, with reference to FIG. 1, how a mobile phone (data transmission device) in accordance with the present invention is configured. FIG. 1 is a block diagram illustrating how a main part of a mobile phone 1 is configured.

As illustrated in FIG. 1, the mobile phone 1 includes a control section 10, a transmission request receiving section 11, an image data transmitting section 12, a display control section 13, a display section 14, an operation input section 15, an image data receiving section 16, a transmission setting management database 50, and an image data database 51. These are described as follows.

(Control Section 10)

The control section 10 is for controlling overall operations of the mobile phone 1. As illustrated in FIG. 1, the control section 10 includes a search section 20, a transmission setting section 21, and a storage information identification section 22. The search section 20, the transmission setting section 21, and the storage information identification section 22 are described as follows.

(Search Section 20)

The search section 20 searches for a piece of image data registered in the transmission setting management database 50, at a time when (i) the mobile phone 1 has received a transmission request for transmitting a piece of image data 3 from an external device (data receiving device) or (ii) a communication is established between the mobile phone 1 and the external device. Note that, in a case where the piece of image data is associated with a transmission time period during which the piece of image data is allowed to be transmitted, the search section 20 detects the piece of image data which is set to be allowed to be transmitted at the time when (a) the mobile phone 1 has received the transmission request or (b) a communication has become possible between the mobile phone 1 and the external device.

Note in the Description etc. that the phrase "the mobile phone 1 can transmit" means that the mobile phone 1 is in a state where it can promptly transmit data, i.e., in a state where (i) a communication between the mobile phone 1 and the external device (data receiving device) has been established or (ii) in a case where the mobile phone 1 transmits a search signal searching for an external device, the mobile phone 1 receives a response signal in response to the search signal. Further, the phrase "data is transmittable" means that the mobile phone 1 is in a state where the mobile phone 1 can promptly transmit the data in a case where the mobile phone 1 can transmit. That is, the phrase "image data that is set to be transmittable at a time when the mobile phone 1 has received a transmission request" means image data in which the time when the transmission request is received is set as the transmission time period, i.e., the image data in which the time when the transmission request is received is contained in the associated transmission time period. Further, the term "transmission time period" means a time period during which the image data is transmittable.

(Transmission Setting Section 21)

The transmission setting section 21 registers, on the transmission setting management database 50, a piece of image data that a user wants to transmit. Note that the transmission setting section 21 can register (i) the piece of image data, (ii) a transmission time period of the piece of image data, and (iii) a transmission medium via which the piece of image data is to be transmitted, such that they are associated with one another.

(Storage Information Identification Section 22)

The storage information identification section 22 identifies a type of a piece of process specifying information stored in the piece of image data. For example, in a case of the piece of image data 3 shown in FIG. 2, the storage information identification section 22 identifies the URL and the position information as being stored in the respective pieces of process specifying information 5.

(Transmission Request Receiving Section 11 and Image Data Transmitting Section 12)

The receiving section 11 receives a transmission request, for transmitting a piece of image data, which is transmitted from an external device (data receiving device). The image data transmitting section 12 transmits the piece of image data to the external device (data receiving device) via for example (i) wireless connection such as IEEE 802.11 wireless, infrared (e.g., IrDA or remote control), or Bluetooth® or (ii) a non-contact IC. How the piece of image data is transmitted is specifically described later.

(Image Data Receiving Section 16)

The image data receiving section 16 receives a piece of image data from an external device (e.g., an image data generation device). The image data receiving section 16 can be the one which receives (i) the piece of image data via Bluetooth® or infrared or (ii) an email etc. to which the piece of image data is attached. Upon receiving the piece of image data, the image data receiving section 16 registers the received piece of imaged data on the image data database 51. Note here that, in a case where the piece of image data is attached to other data, the image data receiving section 16 extracts the piece of image data from the other data and registers the piece of image data on the image data database 51.

(Display Control Section 13 and Display Section 14)

The display control section 13 controls overall image display operations of the display section 14, which is, for example, an image display monitor such as a liquid crystal monitor. For example, the display control section 13 controls the display section 14 to display a piece of image data read out from the image data database 51. Note here that the display control section 13 preferably controls the display section 14 to display the piece of image data so that a marker (identification information) is superimposed on the piece of image data. The marker indicates that the piece of image data stores a piece of process specifying information. The marker is described later in detail.

(Operation Input Section 15)

An operation input section 15 is made up of a plurality of keys. While each key is being pressed, the operation input section 15 supplies a corresponding predetermined signal to the control section 10. This allows a user to cause the mobile phone 1 to carry out a predetermined process. For example, in a case where the plurality of keys are associated with predetermined numbers, Japanese characters, alphabets, and symbols, the user can supply, to the mobile phone 1, each of the numbers, Japanese characters alphabets, and symbols associated with a corresponding one of the plurality of keys, by pressing a key.

Alternatively, the user can supply to the mobile phone 1 the numbers, Japanese characters, alphabets, or symbols by pressing cursor keys such as arrow keys and an enter key so as to select a target one of the numbers, Japanese characters, alphabets, and symbols which are displayed on the display section 14.

(Transmission Setting Management Database 50 and Image Data Database 51)

A piece of image data to be transmitted in response to a transmission request is registered on the transmission setting management database 50. In a case where it is possible to set (i) a transmission time period of the piece of image data and (ii) the type of a transmission medium via which the piece of image data is transmitted, the transmission setting management database 50 can store the piece of image data, the transmission time period of the piece of image data, and the transmission medium of the piece of image data so that they are associated with one another. The transmission setting management database 50 does not necessarily store the substance of a piece of image data. The transmission setting management database 50 can therefore store a pointer to the piece of image data which is stored in the image data database 51. In the image data database 51, the piece of image data is stored.

Note in the Description etc. that (i) a transmission medium via which a piece of image data is to be transmitted, (ii) a time period during which the piece of image data is to be transmitted, (iii) whether or not the piece of image data has been transmitted, and the like are collectively referred to as a "transmission setting" of the piece of image data. Further, in the Description etc., a process in which (a) the transmission setting is registered on the transmission setting management database 50 and (b) the piece of image data is set to be transmittable in response to the transmission request from a data receiving device, is also referred to as "transmission schedule".

(Transmitting Image Data from Mobile Phone 1)

Figure 3:
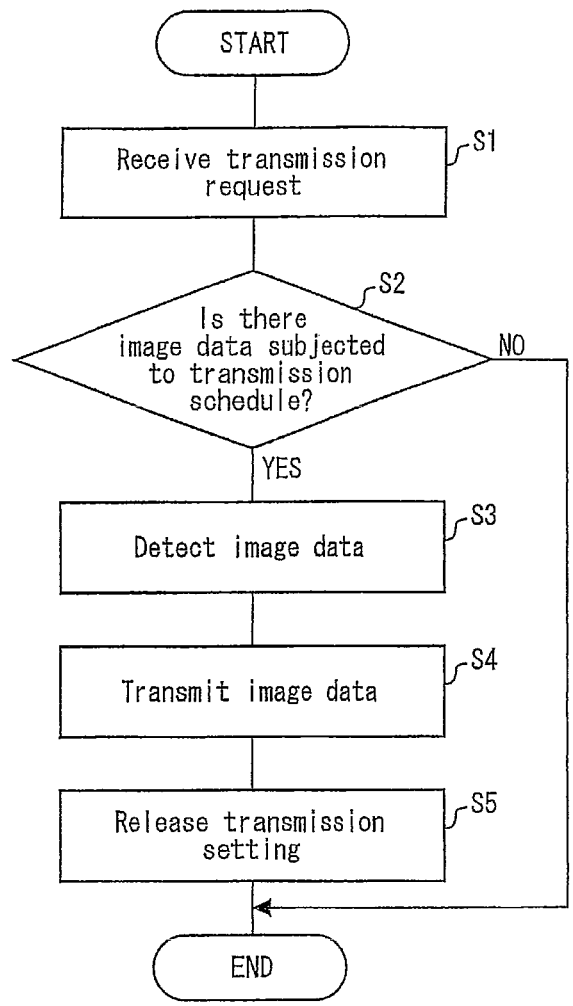
FIG. 3 is a flowchart illustrating how the mobile phone in accordance with the present invention transmits the piece of image data.

Next, the following description discusses, with reference to FIG. 3, how the mobile phone 1 transmits a piece of image data. FIG. 3 is a flowchart illustrating how the mobile phone 1 transmits the piece of image data.

When the receiving section 11 receives a transmission request of a piece of image data from an external device (data receiving device) (step S1), the search section 20 searches the transmission setting management database 50 so as to confirm whether or not a piece of image data exists whose transmission setting has been registered (step S2). That is, the search section 20 searches to confirm whether or not a piece of image data 3 exists that has been subjected to the transmission schedule.

In a case where the search section 20 has found no image data whose transmission setting has been registered on the transmission setting management database 50 (NO in step S2), i.e., no image data that has been subjected to the transmission schedule, the mobile phone 1 does not transmit any piece of image data to the data receiving device which has transmitted the transmission request to the mobile phone 1.

In a case where the search section 20 has found that a piece of image data, whose transmission setting has been registered, is registered on the transmission setting management database 50 (YES in step S2), i.e., in a case where the search section 20 has found a piece of image data that has been subjected to transmission schedule, the search section 20 sets the piece of image data as a piece of image data to be transmitted to the data receiving device which has transmitted the transmission request to the mobile phone 1 (step S3).

Next, the transmitting section 12 reads out, from the image data database 51, the piece of image data set by the search section 20. Then, the transmitting section 12 transmits the piece of image data to the external device which has transmitted the transmission request to the mobile phone 1 (step S4). Note here that the piece of image data is transmitted by the transmitting section 12 via a transmission medium that is registered on the transmission setting management database 50 so as to be associated with the piece of image data to be transmitted.

The display control section 13 preferably controls the display section 14 to display a notification indicating that the piece of image data is being transmitted. After the piece of image data has been transmitted, the display control section 13 preferably further controls the display section 14 to display a notification indicating that the piece of image data has been transmitted.

Lastly, the control section 10 releases the transmission setting of the piece of image data that has been transmitted (step S5). Specifically, the control section 10 sets, to the piece of image data in the transmission setting management database 50, a flag indicating that the piece of image data has been transmitted. Alternatively, the control section 10 deletes, from the transmission setting management database 50, information regarding the piece of image data.

Note that the information regarding the piece of image data can be deleted from the transmission setting management database after ensuring that a recipient device has received the piece of image data. Whether or not the recipient device has received the piece of image data can be confirmed, for example, (i) by using a response signal (e.g., ACK (Acknowledgement) or the like) which is transmitted in conformity with a normal data transmission protocol or (ii) by receiving, from the recipient device, a signal such as a signal indicating that "setting has been completed" or "ready to delete".

According to the foregoing description, the procedure was discussed in which the piece of image data that has been subjected to transmission schedule is searched for after the transmission request from the data receiving devices has been received. The order of the procedure is, however, not limited to that one described above. For example, the mobile phone 1 can first receive a signal for confirming whether or not there exists a piece of image data that has been subjected to transmission schedule, and then receive a transmission request from the data receiving device. In such a case, (a) the mobile phone 1 notifies the data receiving device that there is the piece of image data that has been subjected to transmission schedule, (b) the data receiving device receives the notification, and then (c) the data receiving device transmits the transmission request (transfer request) to the mobile phone 1. Alternatively, for example, the mobile phone 1 can search for, without receiving a transmission request, a piece of data that has been subjected to transmission schedule, upon detecting a state in which a communication has been established between the mobile phone 1 and the data receiving device (i.e., a state in which data has been transmittable to the data receiving device).

(Advantage of Mobile Phone 1)

As has been described, according to the mobile phone 1 of the present invention, (i) a piece of image data to be transmitted to the data receiving device is registered on the transmission setting management database 50 and then (ii) the piece of image data registered on the transmission setting management database 50 is transmitted in response to the transmission request from the data receiving device.

It is therefore possible to transmit a variety of pieces of image data to the data receiving device, by changing the pieces of image data which are registered on the transmission setting management database 50. This allows the mobile phone 1 to transmit a user's desired piece of image data to the data receiving device which has transmitted the transmission request to the mobile phone 1.

(Case where Transmission Time Period can be Set)

A schedule setting section 21 can register a transmission time period of a piece of image data on the transmission setting management database 50 such that the transmission time period and the piece of image data are associated with each other. In such a case, the processes can be carried out by (i) confirming that the piece of image data is registered on the transmission setting management database 50 (step S2) and (ii) checking, before transmitting the piece of image data to the data receiving device, whether or not the transmission time period is set with respect to the piece of image data.

Specifically, the search section 20 searches, in the transmission setting management database 50, for a piece of image data 3 whose transmission time period includes a time at which the transmission request from the data receiving device has been received. In a case where the search section 20 has found that no image data, whose transmission time period includes the time at which the transmission request from the data receiving device has been received, is registered on the transmission setting management database 50, the mobile phone 1 does not transmit any piece of image data to the data receiving device which has transmitted the transmission request to the mobile phone 1.

In a case where the search section 20 has found that the piece of image data, whose associated transmission time period includes the time at which the transmission request from the data receiving device has been received, is registered on the transmission setting management database 50, the mobile phone 1 sets the piece of image data as a piece of image data to be transmitted to the data receiving device which has transmitted the transmission request to the mobile phone 1.

Note here that it is possible to proceed as follows. Namely, in a case where the search section 20 has found in the transmission setting management database 50 a first piece of image data whose transmission time period comes before the time at which the transmission request from the external device has been received while the search section 20 is searching for a second piece of image data whose transmission time period includes the time at which the transmission request from an external device has been received, the search section 20 can release the transmission setting of the first piece of image data. In such a case, the display control section 13 preferably controls the display section 14 to display a notification indicating that the piece of image data failed to be transmitted.

(Advantage Brought about when Transmission Setting can be Made)

According to the above configuration in which by allowing a time period, during which the piece of image data is to be transmitted, to be further set in addition to the transmission setting, it is possible not only to start a communication between a server and a client whenever the server and the client are within a range where they can communicate with each other, but also to set a time at which such a communication is to be started. Specifically, upon receiving the transmission request from the data receiving device, the mobile phone 1 of the present embodiment in accordance with the present invention transmits, among pieces of image data registered on the transmission setting management database 50, a piece of image data which is registered so as to be associated with the transmission time period including the time at which the transmission request has been received. In other words, the mobile phone 1 transmits, to the data receiving device, a piece of image data whose transmission time period allows such a piece of image data to be transmitted at the time when the request from the data receiving device has been received, among the pieces of image data registered on the transmission setting management database 50.

The mobile phone 1 in accordance with the present invention can therefore transmit the piece of image data during a user's desired time period, as long as the transmission request from the data receiving device has been received during the user's desired time period. Accordingly, by causing the piece of image data to be subjected to transmission schedule, it is possible to transmit, during the user's desired time period, the piece of image data to the data receiving device in response to the transmission request from the data receiving device, even if the user forgets to transmit the piece of image data.

For example, in a case where the user arranges pieces of travel schedule data for an overnight trip, the user should transmit, to a car navigation system, (i) one of the pieces of travel schedule data for the first day on the first day and (ii) the other of the pieces of travel schedule data for the second day on the second day. However, even though the user remembers to transmit the pieces of travel schedule data as of the day when the user arranged the pieces of travel data, a situation will occur in which the user may forget about the pieces of travel schedule data as time passes and may accidentally forget to transmit the pieces of travel schedule data to the car navigation system. Note here that each of the pieces of travel schedule data is a piece of data storing information for instructing the car navigation system to search a route to a destination. In order to address such a situation, when the piece of travel schedule data for the first day and the piece of travel schedule data for the second day are registered on the transmission setting management database 50, (i) a transmission time period of the piece of travel schedule data for the first day is set to the date of the first day and (ii) a transmission time period of the piece of travel schedule data for the second day is set to the date of the second day. This makes it possible to transmit, to the car navigation system, (a) the piece of travel schedule data for the first day on the first day and (b) the piece of travel schedule data for the second day on the second day.

More specifically, in a case where pieces of travel schedule data for an overnight trip from Jul. 19, 2008 to Jul. 20, 2008 are subjected to transmission schedule on July 18, (i) a transmission time period of the piece of travel schedule data for the first day (Jul. 19, 2008) can be set to a period from 0:00 (or not specified) on Jul. 19, 2008 to 23:59 on Jul. 19, 2008 and (ii) a transmission time period of the piece of travel schedule data for the second day (Jul. 20, 2008) can be set to a period from 0:00 (or not specified) on Jul. 20, 2008 to 23:59 on Jul. 20, 2008. Note here that each of the pieces of travel schedule data is a piece of image data storing a piece of process specifying information for instructing the car navigation system (data receiving device) to search a route to a destination.

Since the transmission time period of each of the pieces of travel schedule data is set as above, the piece of travel schedule data for the first day is automatically transmitted from the mobile phone 1 to the car navigation system at a time when the car navigation system is activated on July 19 by a user in a car. Further, the piece of travel schedule data for the second day is automatically transmitted from the mobile phone 1 to the car navigation system at a time when the car navigation system is activated on July 20 by the user in the car. Accordingly, the user does not have to transmit the pieces of travel schedule data to the car navigation system by bothering to operate the mobile phone 1 when starts driving the car. Moreover, even if the user forgets to transmit the pieces of travel schedule data to the car navigation system, the pieces of travel schedule data are automatically transmitted to the car navigation system.

(Screens Displayed on Display Section 14 during Transmission Scheduling)

Figure 4:
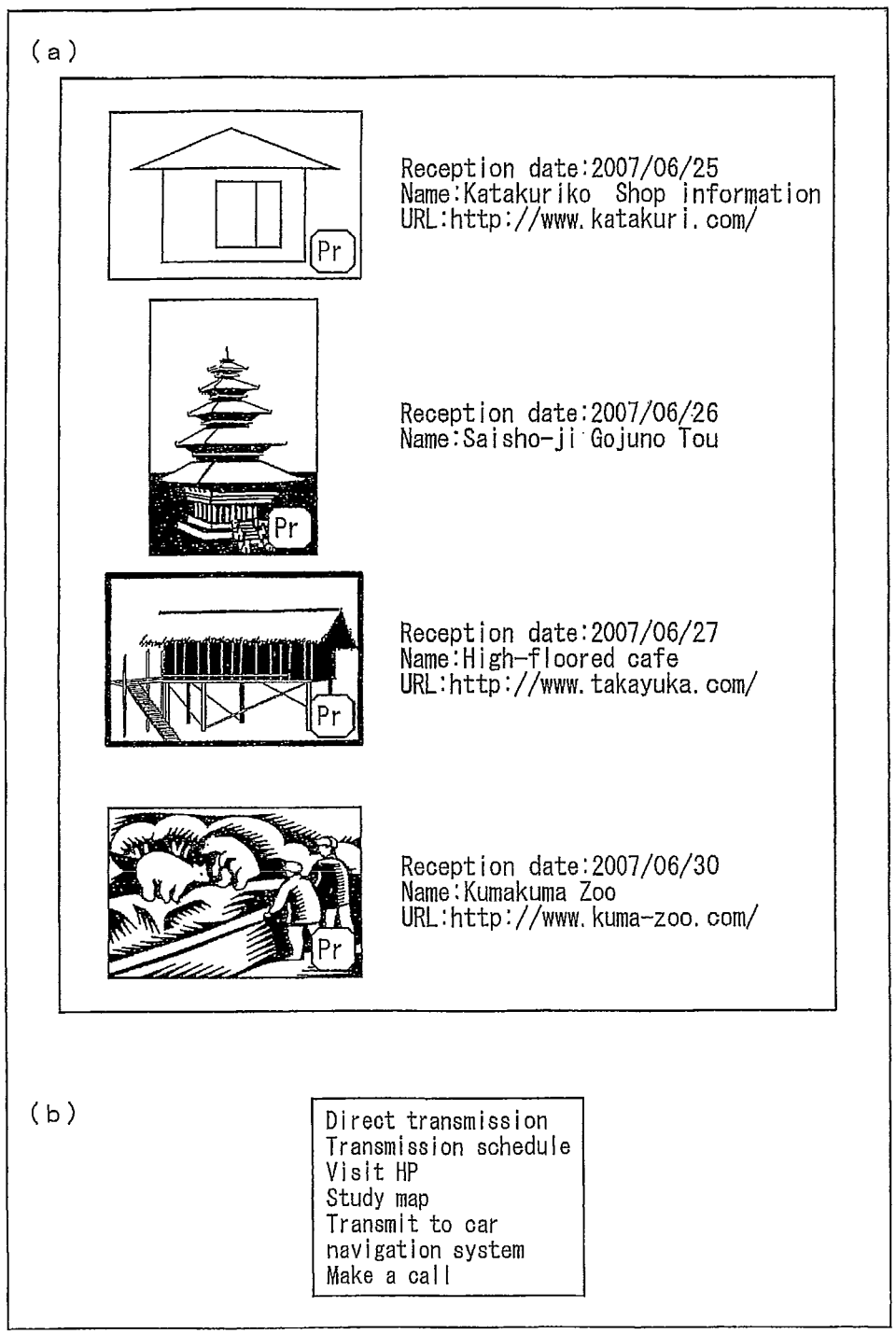
FIG. 4 illustrates one example of how image data is displayed on a display section. (a) of FIG. 4 is a view illustrating one example of a list view of the pieces of image data. (b) of FIG. 4 is a view illustrating one example of a menu screen displayed upon selection of one of the pieces of image data.
Figure 6:
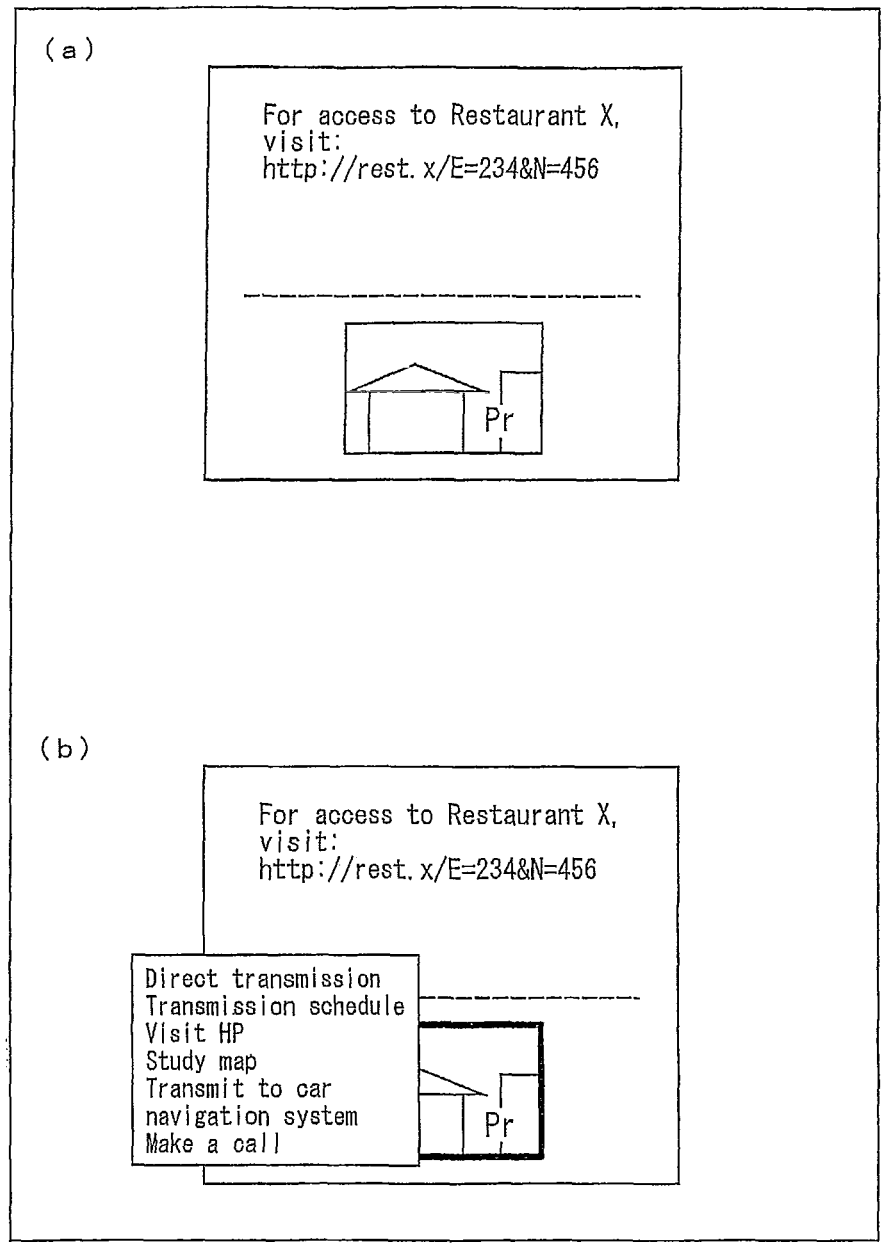
FIG. 6 illustrates another example of how image data is displayed on the display section. (a) of FIG. 6 is a view illustrating one example of how a piece of image data is displayed. (b) of FIG. 6 is a view illustrating one example of a menu screen displayed upon selection of the piece of image data.

Next, the following description specifically discusses, with reference to (a) and (b) of FIG. 4 and FIG. 5, how screens are displayed on the display section 14 when a transmission setting of a piece of image data is registered on the transmission setting management database 50.

First, a user instructs to display a piece of image data via the operation input section 15. Upon receipt of the instruction, the control section 10 controls the display control section 13 to control a display of the piece of image data registered on the image data database 51. Then, the display control section 13 controls the display section 14 to display the piece of image data registered on the image data database 51. (a) and (b) of FIG. 4 illustrate examples of how pieces of image data are displayed on the display section 14. (a) and (b) of FIG. 4 illustrate examples of how the pieces of image data are displayed on the display section 14. (a) of FIG. 4 illustrates one example of a list view of the pieces of image data. (b) of FIG. 4 illustrates one example of a menu screen displayed upon selection of one of the pieces of image data.

Note here that the display control section 13 preferably controls the display section 14 so that the user can recognize the piece of image data as the data storing a piece of process specifying information. For example, a marker such as a mark "Pr" shown in (a) of FIG. 4 can be displayed so that the mark "Pr" and each of the pieces of image data are superposed. Alternatively, "a piece of process specifying information is stored" can be displayed outside or in the vicinity of the piece of image data. This allows the user to easily recognize that a displayed piece of image data stores a piece of process specifying information.

Further, in a case where the pieces of image data are displayed in list view, it is preferable that each information regarding the pieces of image data be displayed along with a corresponding one of thumbnail pieces of image data (see (a) of FIG. 4). Examples of each information to be displayed include, for example, a date on which the mobile phone 1 received a corresponding one of the pieces of image data and a name of the corresponding one of the pieces of image data. In a case where each of the pieces of image data stores a corresponding URL as a parameter which is attached to a corresponding one of the pieces of process specifying information, the corresponding URL can be displayed along with the corresponding one of the pieces of image data (see (a) of FIG. 4). It is needless to say that data other than the URL can be displayed. For example, in a case where each of the pieces of the image data stores a corresponding GPS information (information on latitude and longitude), (i) the latitude and longitude or (ii) an address specified by the latitude and longitude can be displayed along with the each of the pieces of image data.

Next, the user selects one of the pieces of image data displayed in list view, via the operation input section 15. Upon selection by the user, the display control section 13 controls the display section 14 to display the menu shown in (b) of FIG. 4. Note that the present embodiment describes an example in which a piece of image data of "High-floored cafe" is selected.

In a case where the user selects the item of "Direct transmission" from the menu shown in (b) of FIG. 4, the piece of image data of "High-floored cafe" is immediately transmitted to the data receiving device. Note here that, in a case where (i) the mobile phone 1 can transmit data via a plurality of transmission media and (ii) the user selects the "Direct transmission", a menu for selecting a transmission medium via which the piece of image data is to be transmitted can be displayed for a user's selection. In a case where the user selects the item of "Visit HP", the mobile phone 1 itself executes the piece of process specifying information stored in the piece of image data "High-floored cafe", and controls the display section 14 to display a homepage of the "High-floored cafe". In a case where the user selects the item of "Study map", the mobile phone 1 itself executes the piece of process specifying information stored in the piece of image data of "High-floored cafe", and controls the display section 14 to display the map which informs where the "High-floored cafe" is located. In a case where the user selects the item of "Transmit to car navigation system", the mobile phone 1 transmits the piece of image data of "High-floored cafe" to the car navigation system. Note here that the piece of image data of "High-floored cafe" is preferably transmitted via a predetermined transmission medium. In a case where the user selects the item of "Make a call", the mobile phone 1 itself executes the piece of process specifying information stored in the piece of image data of "High-floored cafe", and make a phone call to the "High-floored cafe".

The items, in the menu displayed when a piece of image data is selected, are changed depending on a piece of process specifying information stored in the piece of image data. Setting of the items, in the menu displayed when a piece of image data is selected, is described later.

The following description discusses what will occur in a case where the user selects the item of "Transmission schedule" in the menu of (b) of FIG. 4. In a case where (i) no transmission time period is set with respect to the piece of image data and (ii) the use selects the item of "Transmission schedule" in the menu of (b) of FIG. 4, the display control section 13 can just control the display section 14 to display a notification indicating that the transmission schedule has been accepted. On the other hand, in a case where the transmission time period is set with respect to the piece of image data, a display control device 13 controls the display section 14 to display a screen shown in FIG. 5. FIG. 5 illustrates one example of a screen displayed during the transmission setting of the piece of image data.

In a case where the user selects the item of "Transmission schedule" in the menu of (b) of FIG. 4, the display control section 13 controls the display section 14 to display a screen via which the user sets (i) a transmission time period during which the piece of image data of "High-floored cafe" is to be transmitted and (ii) a transmission medium via which the piece of image data is to be transmitted (see FIG. 5). Note in FIG. 5 that the "Transmission time period" is for setting the transmission time period during which the piece of image data of "High-floored cafe" is to be transmitted, and the "Transmission method" is for setting the transmission medium via which the piece of image data of "High-floored cafe" is to be transmitted.

As illustrated in FIG. 5, time and date during which the piece of image data is allowed to be transmitted are set as the "Transmission time period". The setting shown in FIG. 5 indicates that the piece of image data of "High-floored cafe" is transmitted in a case where a transmission request from the data receiving device is received during a period from 0:00 to 23:59 on Jul. 19, 2008. Further, the setting of the transmission medium shown in FIG. 5 indicates that the piece of image data of "High-floored cafe" is to be transmitted via Bluetooth®.

Lastly, the user selects the item of "Set" shown in FIG. 5 by operation which is carried out by the user via the operation input section 15. This causes the transmission setting section 21 to register the transmission setting of the piece of image data of "High-floored cafe" on the transmission setting database 50. That is, the transmission setting section 21 causes the piece of image data of "High-floored cafe" to be subjected to transmission schedule. Note here that the display control section 13 preferably controls the display section 14 to display a notification indicating that the transmission schedule has been completed.

The "transmission time period" can be set by selecting each item and then pressing the number keys of the operation input section 15 or can be set by selecting desired numbers from a pull-down menu displayed when each item is selected. The "transmission method" is preferably set by selecting a desired transmission medium from a pull-down menu displayed when the item is selected (see FIG. 5).

Note here that not all of the items in the "Transmission time period" have to be specified. For example, if none of the items in the "Transmission time period" are specified, then the transmission scheduling is made in which the piece of image data of "High-floored cafe" is to be transmitted when the transmission request is received from the data receiving device anytime after the completion of the transmission schedule. That is, a setting is made so that the piece of image data of "High-floored cafe" is allowed to be transmitted at any time. Alternatively, for example, if (i) date and time are all empty and (ii) year and month are set to July 2008 and August 2008, then the transmission schedule is made in which the piece of image data of "High-floored cafe" is to be transmitted in response to the transmission request received from the data receiving device anytime in between July and August of 2008.

In the case where a desired number is selected from the pull-down menu, an option of "none specified" can be further contained in the pull-down menu so that the user can select it.

Further, the "Transmission method" can be arranged such that a plurality of transmission methods are selected. In this case, a piece of image data is to be transmitted via a plurality of transmission media.

(Another Display Example of Image Data 3)

The foregoing embodiment describes with the example in which the pieces of image data are displayed as illustrated in (a) and (b) of FIG. 4. Note, however, that how the pieces of image data are displayed is not limited to the example. For example, each of the pieces of image data can be individually displayed on the display section 14 (see (a) and (b) of FIG. 6). In such a case, the menu shown in (b) of FIG. 6 can be displayed when the each of the pieces of image data displayed on the display section 14 is selected. Alternatively, the each of the pieces of image data illustrated in (a) of FIG. 6 can be displayed when a thumbnail in the list of (a) of FIG. 4 is selected.

(Details of how Transmission Setting Section 21 Operates when Transmission is Scheduled)

A management table illustrated in FIG. 7 is registered on the transmission setting management database 50. That is, the transmission setting section 21 carries out the transmission schedule for a piece of image data, by registering a transmission setting, which is entered by the user, on the management table illustrated in FIG. 7. FIG. 7 illustrates one example of the management table on which each piece of image data, a corresponding transmission time period, and a corresponding transmission medium are registered such that they are associated with one another.

A time at which a transmission schedule has been completed is registered, as "Time at which transmission scheduling is accepted", on the management table. The transmission schedules which have been set are shown to a user in order of the time when theirs transmission schedules were accepted (chorological order or reverse chronological order). A time period entered by the user in FIG. 5 is registered, as the "Transmission time period", on the management table. In a case where the user did not enter the transmission time period, none specified is registered as the "Transmission time period" or the "Transmission time period" is left blank (see FIG. 7). In that case, the time at which the transmission schedule has been completed serves as the transmission time period. Specifically, according to the example of FIG. 7, a piece of image data "A. jpg" is set to be transmitted in response to a transmission request anytime after 9:00:05 on Oct. 25, 2008.

A name of the piece of image data to be transmitted is registered, as the "Image data", on the management table.

Note here that (i) the name of the piece of image data to be transmitted or (ii) a location of the image data database 51 in which location the piece of image data is stored can be registered as the "Image data" as illustrated in FIG. 7. Lastly, a transmission medium selected by the user in FIG. 5 is registered, as the "Transmission method", on the management table. In a case where the user selected a plurality of transmission media in FIG. 5, the plurality of transmission media are registered, as the "Transmission method", on the management table (see FIG. 7).

Since a transmission medium via which a piece of image data to be transmitted can thus be further set, it is possible to transmit the piece of image data to the data receiving device via a user's desired transmission medium.

Note that, although FIG. 7 shows the management table on which a plurality of transmission settings are registered, the number of the transmission settings registered is not limited to this and can be therefore only one (1).

(How Transmission Schedule is Set in Case where Transmission Medium for Image Data is Specified)

Although the foregoing description discusses the example in which the transmission time period and the transmission medium are set at the time when the transmission schedule is made, the present embodiment is not limited to this. The mobile phone 1 is capable of setting, in a case where a piece of process specifying information stored in a piece of image data is of a certain type, a predetermined transmission medium as a communication medium via which a piece of image data is to be transmitted from the mobile phone 1 to the data receiving device.

Figure 8:
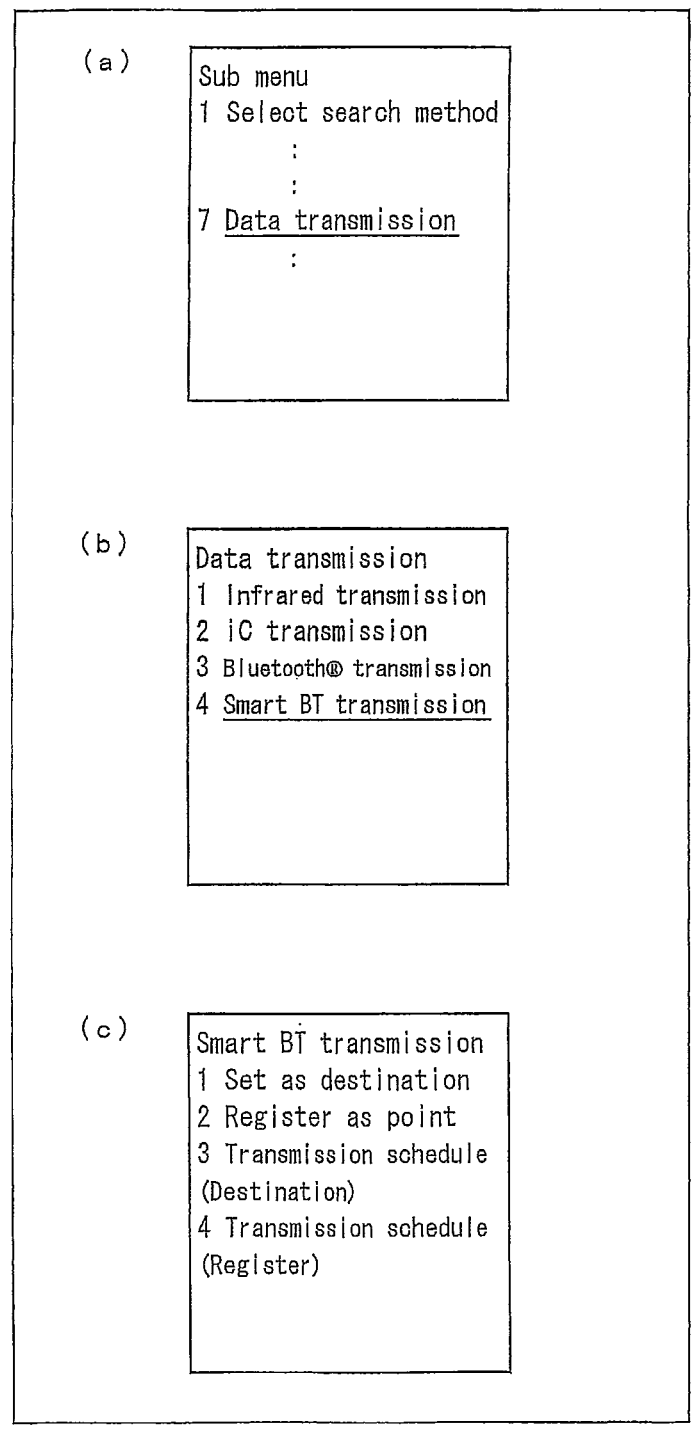
FIG. 8 illustrates one example of how transmission schedule is carried out in a case where a communication method by which a piece of image data is transmitted to a data receiving device is predetermined in advance. (a) of FIG. 8 is a view illustrating a screen displayed upon selection of the piece of image data. (b) of FIG. 8 is a view illustrating a screen showing transmission media via which the piece of image data is to be transmitted. (c) of FIG. 8 is a view illustrating a screen displayed on a display section upon selection of Smart BT transmission.

The following description discusses, with reference to (a) through (c) of FIG. 8, how transmission schedule is set in a case where a communication medium, via which a piece of image data is to be transmitted from the mobile phone 1 to the data receiving device, is predetermined. Note that the following description is discussed with an example in which, in a case where (i) the data receiving device is a car navigation system and (ii) a piece of process specifying information that can be processed by the car navigation system is stored in a piece of image data, the piece of image data is transmitted via the Bluetooth®. (a) through (c) of FIG. 8 show one example of how the transmission schedule is set in the case where the transmission medium, via which a piece of image data is to be transmitted from the mobile phone 1 to the navigation device, is predetermined. (a) of FIG. 8 illustrates a screen displayed when the piece of image data is selected. (b) of FIG. 8 illustrates a screen indicating transmission media via which data is to be transmitted. (c) of FIG. 8 is a screen displayed on the display section 14 when Smart BT transmission is selected. Note in the Description that the Smart BT is set in advance as a communication medium via which a piece of image data is to be transmitted from a data transmission device to a data receiving device. For example, according to the example of FIG. 8, a communication method via which a piece of image data is to be transmitted to the car navigation system is set to the Smart BT in advance.

For example, in a case where the piece of image data of "High-floored cafe" is selected from the pieces of image data displayed in list view as illustrated in (a) of FIG. 4, a menu illustrated in (a) of FIG. 8 is displayed. If a transmission schedule is desired, an item of "Transmit data" is selected from the menu. When the item of "Transmit data" is selected by a user's operation via the operation input section 15, the storage information identification section 22 identifies a piece of process specifying information stored in a selected piece of image data. The control section 10 determines whether or not the piece of process specifying information, which is stored in the piece of image data of "High-floored cafe" and is identified by the storage information identification section 22, can be processed by the car navigation system.

If the control section 10 has determined that the piece of process specifying information stored in the piece of image data of "High-floored cafe" can be processed by the car navigation system, then the control section 10 instructs the display control section 13 to control the display section 14 to display the screen illustrated in (b) of FIG. 8. That is, the display control section 13 controls the display section 14 to display, as a data transmission medium, an item of "Smart BT transmission" so that such an item becomes selectable. If the control section 10 has determined that the piece of process specifying information stored in the piece of image data of "High-floored cafe" cannot be processed by the car navigation system, then the display control section 13 controls the display section 14 to display the item of "Smart BT transmission" so that the item becomes non-selectable, e.g., to display a grayed-out item of "Smart BT transmission".

Next, when the item of "Smart BT transmission" is selected by a user's operation via the operation input section 15, the display control section 13 controls the display section 14 to display the screen illustrated in (c) of FIG. 8. Note here that, in a case where a communication is not established between the car navigation system and the mobile phone 1, an item of "Transmission schedule (Register)" and an item of "Transmission schedule (Destination)" are displayed so as to become selectable, while an item of "Set as destination" and an item of "Register as point" are grayed out or not displayed so that they cannot be selected. On the other hand, in a case where the communication is established between the car navigation system and the mobile phone 1, the item of "Set as destination" and the item of "Register as point" are displayed so as to become selectable, while the item of "Transmission schedule (Destination)" and the item of "Transmission schedule (Register)" are grayed out or not displayed so as to become non-selectable.

Note here that, the item of "Set as destination" and the item of "Transmission schedule (Destination)" shown in (c) of FIG. 8 mean that the piece of image data is to be transmitted to the car navigation system so that a point (in this case, a location of the "High-floored cafe") specified based on GPS information of a selected piece of image data is set as a destination. The item of "Register as point" and the item of "Transmission schedule (Register)" shown in (c) of FIG. 8 mean that the piece of image data is to be transmitted to the car navigation system so that the point (in this case, the location of the "High-floored cafe") specified based on the GPS information of the selected piece of image data is subjected to memory registration.

In a case where the user selects, on the screen illustrated in (c) of FIG. 8, the item of "Transmission schedule (Destination)" or the item of "Transmission schedule (Register)" by operating the operation input section 15, the display control section 13 controls the display section 14 to display a screen via which time and date during which the piece of image data is to be transmitted are to be set. Note here that, since the transmission medium is already set to the Bluetooth® unlike the case shown in FIG. 5, the item of the transmission medium is (i) set so as not to be selectable or (ii) not displayed.

Since a transmission medium, via which a piece of image data is transmitted, is thus set to a predetermined transmission medium in a case where a piece of process specifying information stored in the piece of image data is of a certain type, a user does not have to select a transmission medium every time the user operates to register a transmission setting of a piece of additional-information-containing data. This makes it possible to simplify the registration of the transmission setting.

Further, since the predetermined transmission medium is a communication medium via which the mobile phone 1 and the data receiving device (e.g., a car navigation system) can communicate with each other, it is possible to avoid a piece of image data from being transmitted via a transmission medium via which the data receiving device cannot receive data. This makes it possible to avoid failure of image data transmission.

In addition, the mobile phone 1 can be used, after the piece of image data is transmitted, as an operation device (remote controller) for operating the data receiving device.

Figure 15:
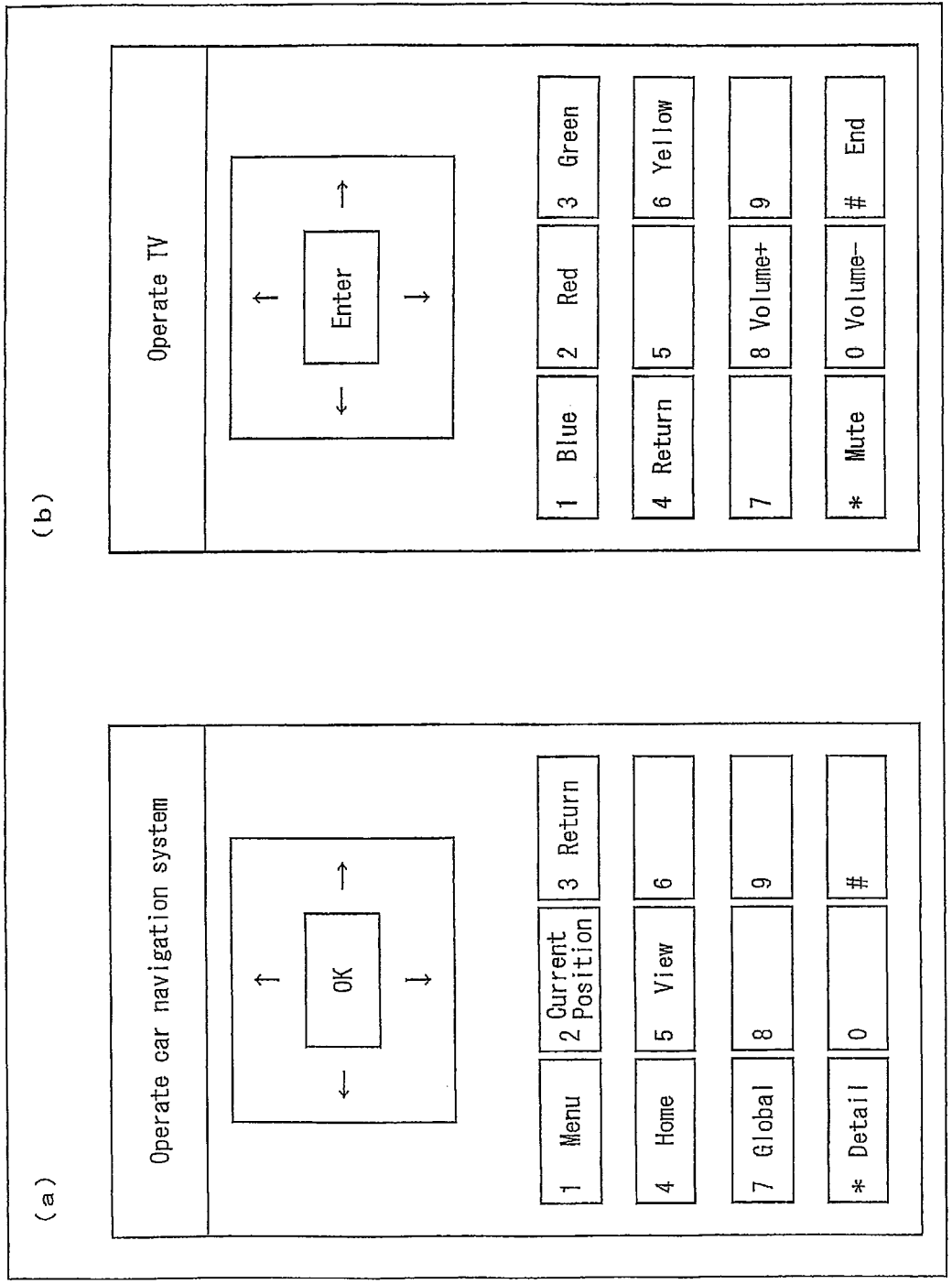
FIG. 15 illustrates examples of a display screen displayed in a case where a mobile phone in accordance with the present invention, which mobile phone has transmitted a piece of image data, is used as an operation device for operating a data receiving device. (a) of FIG. 15 is a view illustrating one example of a screen displayed in a case where a data receiving device is a car navigation system. (b) of FIG. 15 is a view illustrating one example of a screen displayed in a case where the data receiving device is a television.

For example, the following description discusses an example in which the data receiving device is a car navigation system (that is, an example in which the control section 10 has determined that a piece of process specifying information stored in the piece of image data can be processed by the car navigation system). In a case where (i) a communication is established between the car navigation system and the mobile phone 1 and (ii) the item of "Set as destination" or the item of "Register as point" is selected in (c) of FIG. 8, the piece of image data is transmitted, and then the following processes are carried out. That is, a remote controller screen illustrated in (a) of FIG. 15 is displayed on the display section 14 of the mobile phone 1, and functions are allocated to respective buttons of the mobile phone 1 so that the buttons transmit signals instructing their respective functions. This makes it possible for the user to transmit an operation command to the car navigation system via the operation input section 15 of the mobile phone 1 illustrated in (a) of FIG. 15.

The same applies to a case where the data receiving device is a device other than the car navigation system. For example, in a case where the data receiving device is a television (that is, in a case where the control section 10 has determined that a piece of process specifying information stored in the piece of image data can be processed by the television), a remote controller screen illustrated in (b) of FIG. 15 can be displayed on the display section 14, and functions are allocated to respective buttons of the mobile phone 1 so that the buttons transmit signals instructing their respective functions. (a) and (b) of FIG. 15 shows examples of a screen displayed in a case where, after the piece of image data is transmitted, the mobile phone 1 is used as a remote controller for operating the data receiving device. (a) of FIG. 15 illustrates one example of how the screen is displayed in a case where the data receiving device is a car navigation system. (b) of FIG. 15 illustrates one example of how the screen is displayed in a case where the data receiving device is a television. Needless to say, the remote controller screens illustrated in (a) and (b) of FIG. 15 are mere examples. The remote controller screens are not limited to those illustrated in FIG. 15, and therefore can be modified as needed.

The operation commands can be transmitted from the mobile phone 1 to the data receiving device via the image data transmitting section 12 or via other communication means such as infrared communication.

The above description discusses the example in which (i) the control section 10 identifies a data receiving device based on a piece of process specifying information stored in a piece of image data and (ii) a remote controller screen is displayed in accordance with the data receiving device. Note, however, that the present embodiment is not limited to this. For example, the mobile phone 1 can (a) identify a data receiving device by obtaining device information from the data receiving device before and after transmitting of the piece of image data and (b) display a remote controller screen in accordance with the data receiving device.

(Operations in Case where Transmission Time Periods Overlap)

Figure 9:
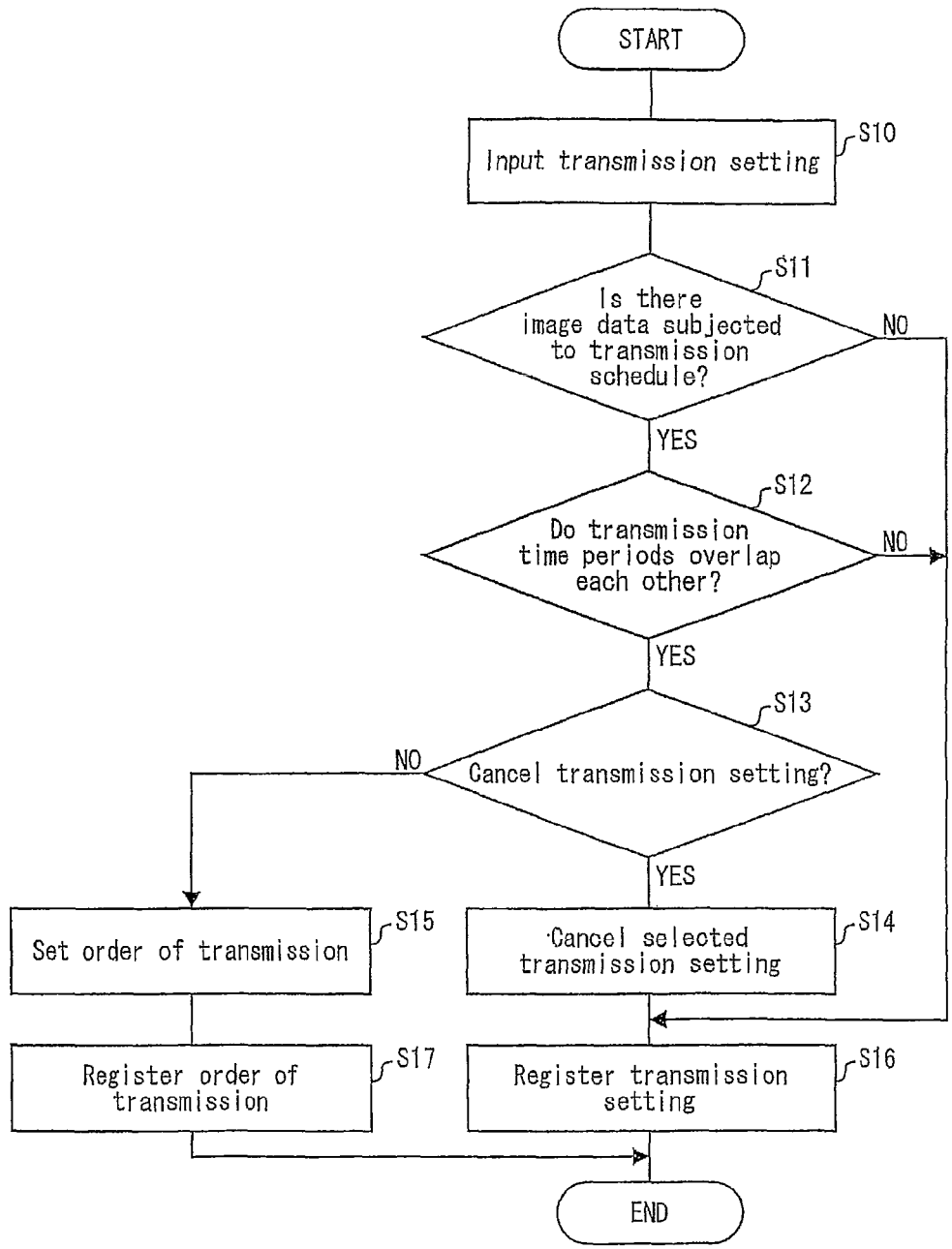
FIG. 9 is a flowchart illustrating how a transmission schedule is carried out in a case where time periods overlap each other.

Next, the following description discusses in detail, with reference to FIG. 9, what operations are carried out in a case where two time periods overlap each other in transmission settings of respective pieces of image data. FIG. 9 is a flowchart illustrating what operations are carried out in a case where two time periods overlap each other in making a transmission schedule of a piece of image data.

First, in a case where a user enters a transmission setting via the operation input section 15 (step S10), the transmission setting section 21 determines whether or not a piece of image data which has been subjected to a transmission schedule is registered on the transmission setting database 50 (step S11). If it is determined by the transmission setting section 21 that no image data which has been subjected to the transmission schedule is registered on the transmission setting database 50 (NO in step S11), then the transmission setting section 21 accepts the transmission setting entered by the user and registers the transmission setting on the transmission setting database 50 (step S16). Note here that the display control section 13 preferably controls the display section 14 to display a notification indicating that the transmission schedule has been completed.

If it is determined by the transmission setting section 21 that the piece of image data which has been subjected to the transmission schedule is registered on the transmission setting database 50 (YES in step S11), then the transmission setting section 21 determines whether or not (i) a first transmission time period of the piece of image data which has been subjected to the transmission schedule and (ii) a second transmission time period of a piece of image data that is intended to be subjected to a transmission schedule (step S12) overlap each other. If it is determined by the transmission setting section 21 that the first and second transmission time periods do not overlap each other (NO in step S12), then the transmission setting section 21 accepts the transmission setting entered by the user and registers the transmission setting on the transmission setting database 50 (step S16). Note here that the display control section 13 preferably controls the display section 14 to display a notification indicating that the transmission scheduling has been completed.

In contrast, if it is determined by the transmission setting section 21 that the first and second transmission time periods overlap each other (YES in step S12), then the mobile phone 1 asks the user whether or not to cancel the transmission setting (step S13). Specifically, the control section 10 instructs the display control section 13 to control the display section 14 to display a message asking whether or not to cancel the transmission setting. Then, the user selects whether or not to cancel the transmission setting via the operation input section 15.

If the user selects to cancel the transmission setting (NO in step 13), the control section 10 instructs the display control section 13 to control the display section 14 to display a message asking the user which one of the transmission settings, whose first and second transmission time periods overlap each other, should be canceled. Then, the user selects, via the operation input section 15, a piece of image data whose transmission setting should be canceled.

When the user selects the piece of image data whose transmission setting should be canceled, the transmission setting section 21 deletes, from the transmission setting database 50, the transmission setting of the piece of image selected by the user (step S14). Then, the transmission setting section 21 registers the transmission setting, which is not selected by the user, on the transmission setting database 50 (step S16). Note here that the display control section 13 preferably controls the display section 14 to display a notification indicating that the transmission scheduling has been completed. Note that, in a case where there are several transmission settings whose transmission time periods overlap one another, the deletion of transmission settings is repeated until no transmission time periods overlap each other.

If the user selects not to cancel any of the transmission settings (YES in step S13), then the control section 10 instructs the display control section 13 to control the display section 14 to display a message asking the user the order in which the pieces of image data, whose transmitting time periods overlap each other, should be transmitted. The user sets the order in which the pieces of image data should be transmitted, via the operation input section 15 (step S15). After the user sets the order in which the pieces of image data should be transmitted, the transmission setting section 21 registers, on the transmission setting database 50, the set order in which the pieces of image data should be transmitted (step S17). Specifically, on the transmission setting database 50, it is possible to prioritize the transmission settings whose transmission time periods overlap each other. Note here that the display control section 13 preferably controls the display section 14 to display a notification indicating that the order of the transmission of the pieces of image data has been set.

The mobile phone 1 can thus make a transmission setting in which a user's desired piece of image data is to be transmitted at a user's desired time, even in a case where there are transmission settings whose transmission time periods overlap each other. Note that how to deal with the case where there are transmission settings whose transmission time periods overlap each other is not limited to those described above. For example, in a case where a mobile phone 1 is capable of registering only one (1) transmission setting, a first transmission setting can be overwritten by a second transmission setting which is registered later than the first transmission setting.

(Generation of Menu Screen)

Figure 10:
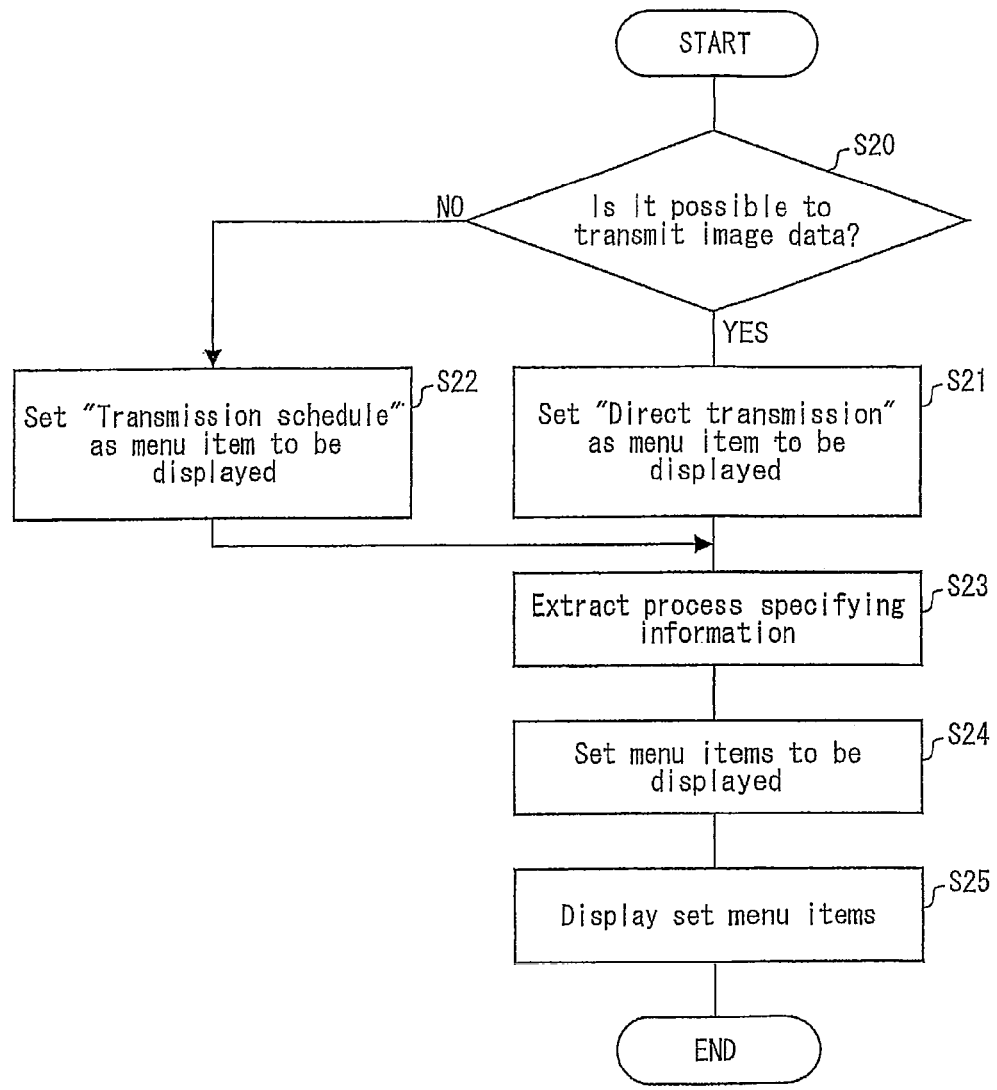
FIG. 10 is a flowchart illustrating how a menu screen is generated.

The following description discusses, with reference to FIG. 10, menu items displayed upon selection of a piece of image data in (a) of FIG. 4. FIG. 10 is a flowchart illustrating how a menu is generated.

First, the control section 10 determines whether or not the mobile phone 1 is in a state where it can transmit a piece of image data to a data receiving device (step S20). If it is determined by the control section 10 that that the mobile phone 1 in the state where it can transmit the piece of image data to the data receiving device (YES in step S20), the control section 10 instructs the display control section 13 to cause a display of the item of "Direct transmission" so that it is selectable (step S21). On the other hand, if it is determined by the control section 10 that the mobile phone 1 is not in the state where it can to transmit the piece of image data to the data receiving device (NO in step S20), the control section 10 instructs the display control section 13 to cause a display of the item of "Transmission schedule" so that it is selectable (step S22).

Since the piece of image data is (i) automatically transmitted immediately if it is determined by the control section 10 that the mobile phone 1 is in the state where it can transmit the piece of image data or (ii) automatically scheduled to be transmitted later if it is determined by the control section 10 that the mobile phone 1 is not in the state where it can transmit the piece of image data, the user is saved from having to make settings. However, the user (a) may not want to immediately transmit the piece of image data even if it is determined by the control section 10 that the mobile phone 1 is in the state where it can transmit the piece of image data or (b) may want to put the mobile phone 1 in the state where it can transmit the piece of image data if it is determined by the control section 10 that the mobile phone 1 is not in the state where it can transmit the piece of image data. In such a case, both the item of "Direct transmission" and the item of "Transmission schedule" can be displayed so as to be selectable, instead of a display of a screen via which either one of the items can only be selected.

Needless to say, it is preferable that (i) the item of "Direct transmission" be preferentially displayed if it is determined by the control section 10 that the mobile phone 1 is in the state where it can transmit the piece of image data and (ii) the item of "Transmission schedule" be preferentially displayed if it is determined by the control section 10 that the mobile phone 1 is not in the state where it can transmit the piece of image data, so as to reduce the number of user's operations to any extent.

Next, the storage information identification section 22 extracts a piece of process specifying information from the piece of image data thus selected, and identifies a type of the piece of process specifying information (step S23). The control section 10 sets, in accordance with the type of the piece of process specifying information identified by the storage information identification information 22, an item to be contained in the menu (step S24). Note here that the item to be contained in the menu can be set with reference to a table in which a type of a piece of process specifying information is associated with a corresponding item to be displayed. The control section 10 instructs the display control section 13 to cause a display of the item corresponding to the piece of process specifying information stored in the piece of image data so that the item is selectable.

Lastly, the display control section 13 controls the display section 14 to display all items which are instructed by the control section 10 to be displayed so as to be selectable (step S25).

As described above, the mobile phone 1 is capable of setting the item to be contained in the menu, in accordance with (i) the type of the piece of process specifying information stored in the piece of image data and (ii) whether or not a communication between the data receiving device and the mobile phone 1 is established. Accordingly, the mobile phone 1 is capable of presenting, to the user, options corresponding to each piece of image data.

(Display of Image Data)

The foregoing embodiment describes with the example in which a marker "Pr", which indicates that a corresponding piece of image data stores a piece of process specifying information, is displayed so that a user easily understands whether or not the corresponding piece of image data stores the piece of process specifying information. Note, however, that the marker indicating that the corresponding piece of image data stores the piece of process specifying information is not limited to this. For example, a marker, which corresponds to the type of the piece of process specifying information stored in the corresponding piece of image data, can be displayed so as to be superimposed on the corresponding piece of image data. This allows the user to easily recognize what type of process specifying information is stored in a piece of image data displayed on the display section 14.

In such a case, the storage information identification section 22 identifies the type of the piece of process specifying information stored in the piece of image data to be displayed on the display section 14. Then, the storage information identification section 22 instructs the display control section 13 to cause a display of a marker corresponding to the type of the piece of process specifying information superimposed on the piece of image data. The display control section 13 controls the display section 14 to display, in accordance with the instruction by the storage information identification section 22, the marker corresponding to the piece of process specifying information stored in the piece of image data so that the maker is superimposed on the piece of image data.

Figure 11:
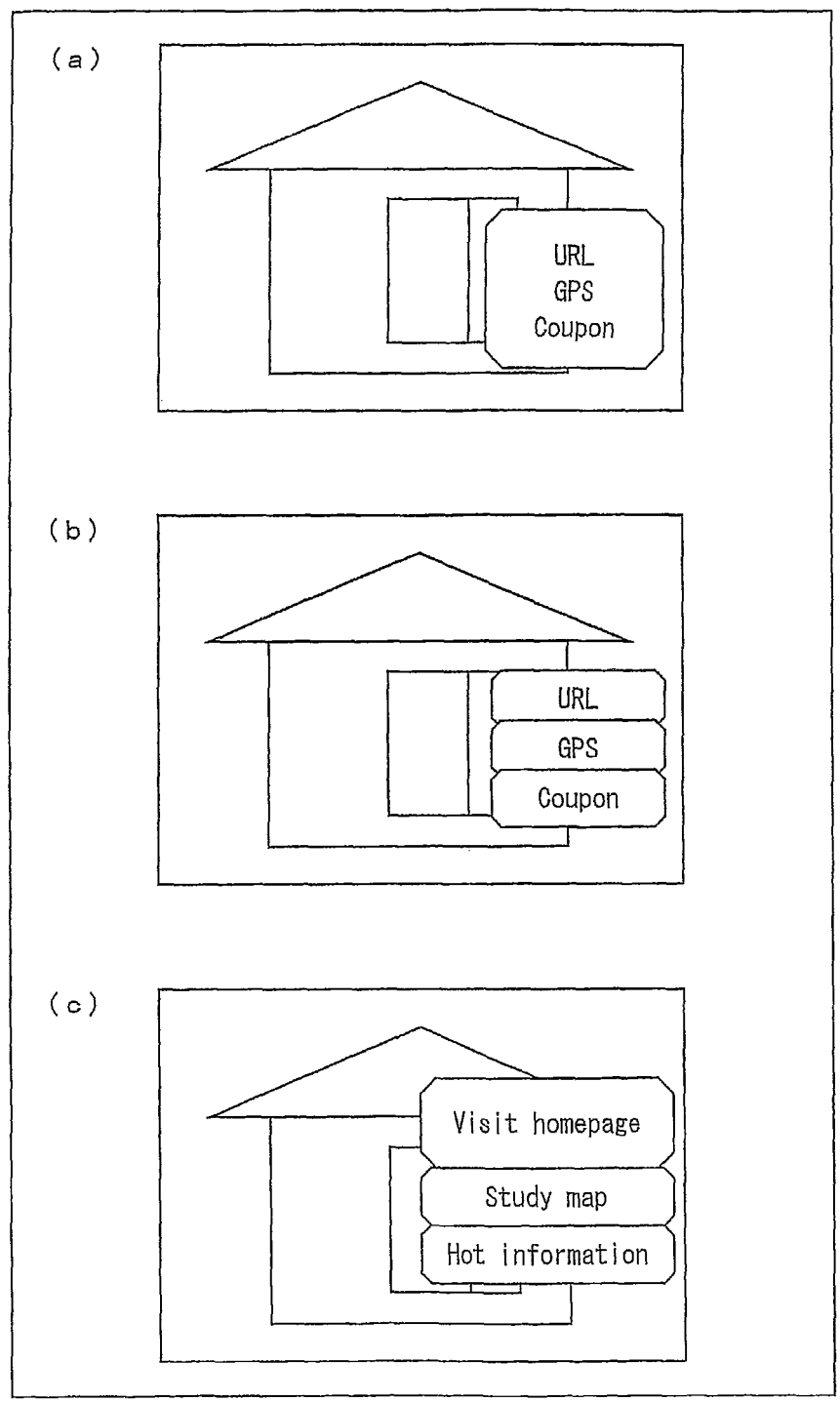
FIG. 11 illustrates one example of how a marker is displayed in accordance with a piece of process specifying information stored in a piece of image data. (a) of FIG. 11 is a view illustrating a display of one (1) marker indicating pieces of process specifying information stored in the piece of image data. (b) of FIG. 11 is a view illustrating a display of a plurality of makers indicating the respective pieces of process specifying information stored in the piece of image data. (c) of FIG. 11 is a view illustrating a display of makers indicating processes specified by the respective pieces of process specifying information stored in the piece of image data.

(a) through (c) of FIG. 11 show examples of markers corresponding to pieces of process specifying information stored in pieces of image data. (a) through (c) of FIG. 11 show examples of how the markers corresponding to the pieces of process specifying information stored in the pieces of image data are displayed. (a) of FIG. 11 illustrates how pieces of information, which indicate the respective pieces of process specifying information, are displayed as one (1) marker. (b) of FIG. 11 illustrates how the pieces of information, which indicate respective pieces of specifying information, are displayed as respective different markers. (c) of FIG. 11 illustrates how the pieces of information, which indicate respective processes that can be carried out in accordance with the pieces of specifying information, are displayed as respective different markers.

Figure 12:
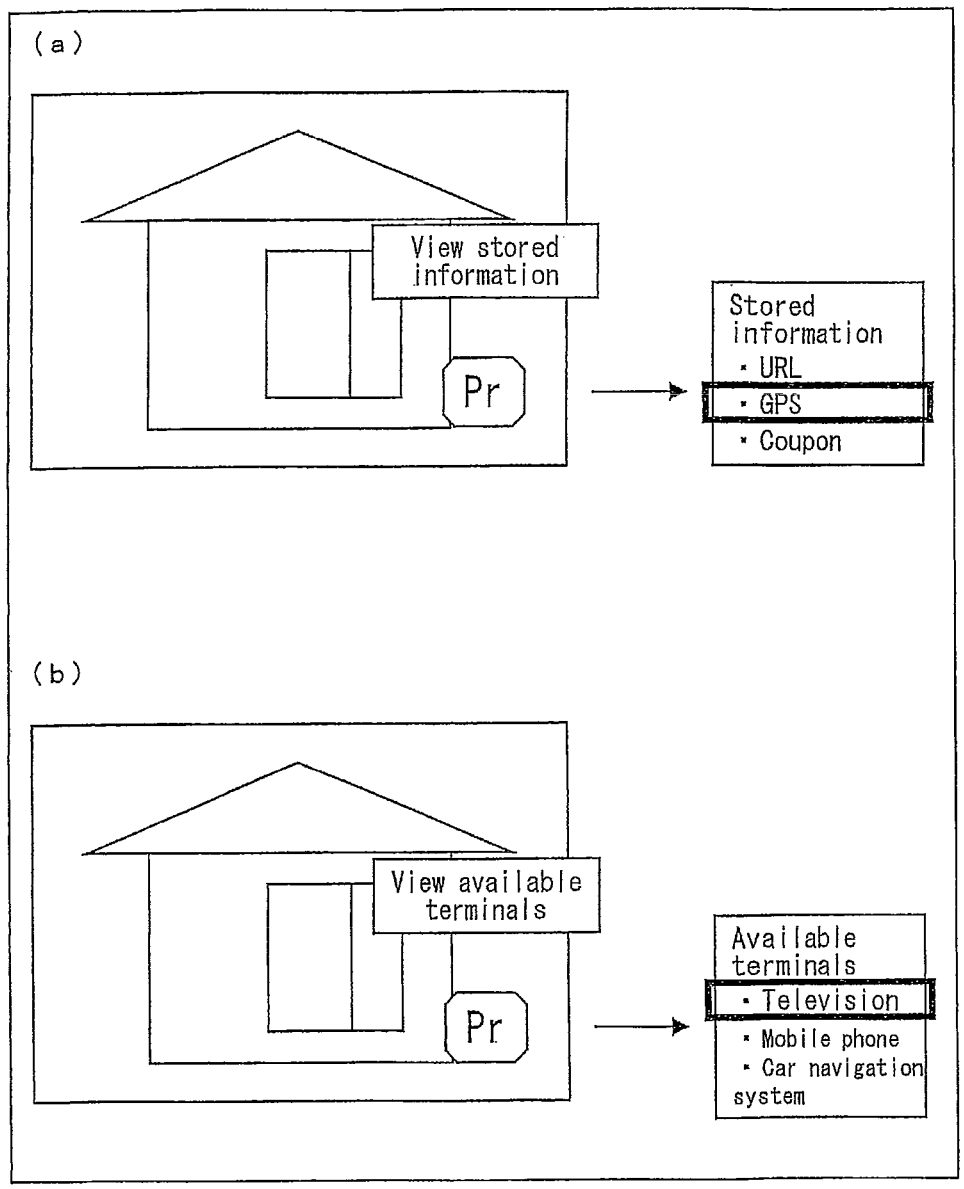
FIG. 12 illustrates another example of how a marker is displayed according to a piece of process specifying information stored in a piece of image data. (a) of FIG. 12 is a view illustrating how pieces of information indicating respective pieces of process specifying information stored in the piece of image data are displayed upon selection of a marker. (b) of FIG. 12 is a view illustrating how pieces of information indicating respective data processing devices capable of handling the pieces of process specifying information stored in the piece of image data are displayed upon selection of the marker.

Further, the display control section 13 can carry out control so that (i) a marker is displayed so that it can be selected by the user via the operation section 16 and (ii) pieces of information which indicate pieces of process specifying information stored in the piece of image data are displayed when the marker is selected by the user via the operation input section 16 (see (a) of FIG. 12). Note here that the pieces of information displayed can be those indicating data processing devices that can handle the pieces of process specifying information stored in the piece of image data (see (b) of FIG. 12). Further, it is preferable that the earlier-described transmission schedule be available by selecting (a) any of the pieces of information which indicate the pieces of process specifying information stored in the piece of image data (see (a) of FIG. 12) or (b) any of the pieces of information indicating the data processing devices that can handle the pieces of process specifying information stored in the piece of image data (see (b) of FIG. 12).

As has been described, the display of the marker(s) corresponding to the type of each of the pieces of process specifying information stored in the piece of image data, which maker(s) superimposed on the piece of image data, allows the user to easily recognize the type of the pieces of process specifying information stored in the piece of image data. This allows the user to easily recognize a data processing device that can execute a process specified by each piece of image data.

Note here that, although the foregoing description discussed the method of displaying a marker superimposed on a piece of image data, the marker does not have to be superimposed on the piece of image data as long as a type of a piece of process specifying information stored in the piece of image data can be recognized from the marker. For example, a marker, a symbol, a text, or the like corresponding to the type of the piece of process specifying information, which is similar to the foregoing marker, can be displayed near the piece of image data.

(Configuration of Data Communication System 500)

Figure 13:
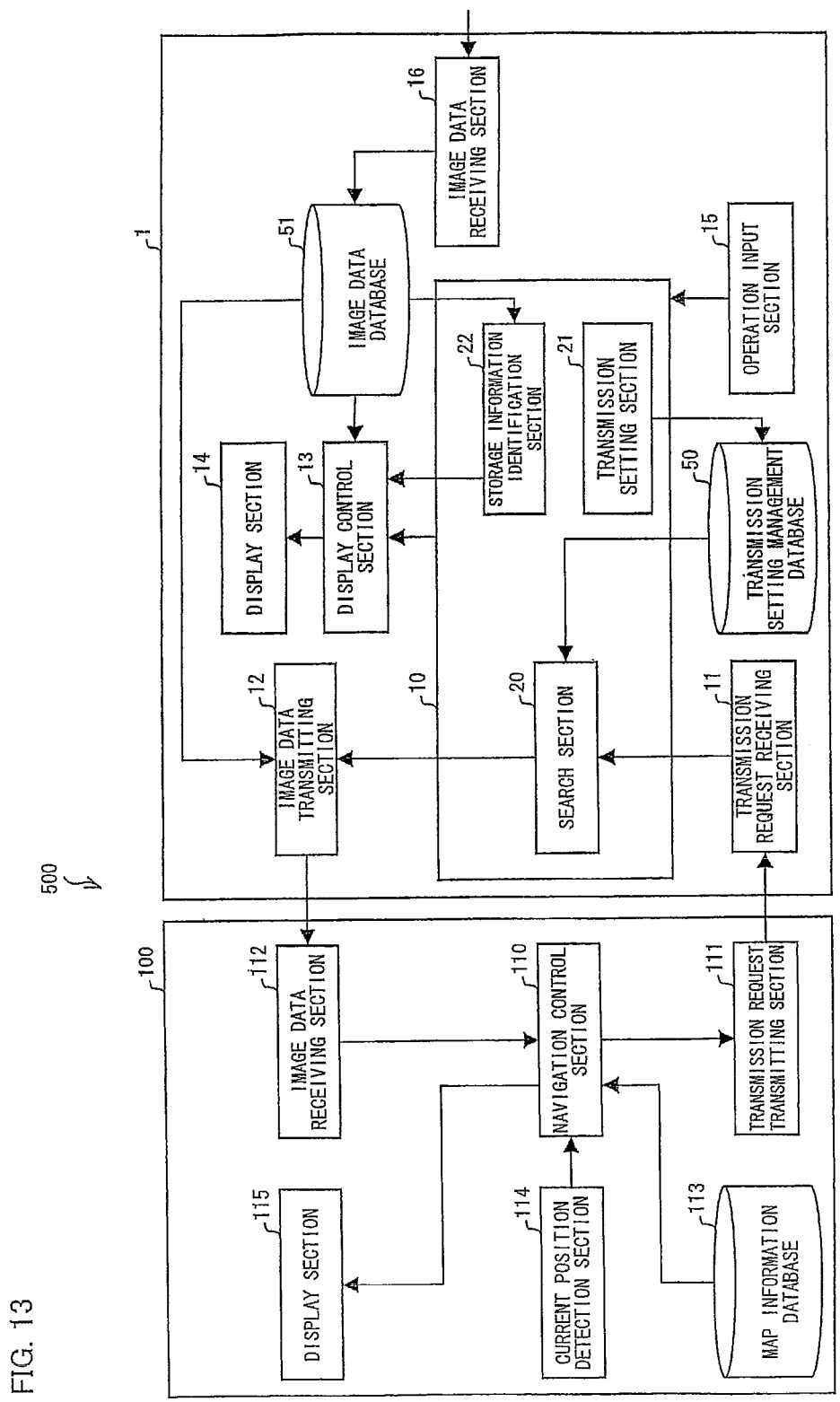
FIG. 13 is a block diagram illustrating how a data communication system in accordance with the present invention is configured.

Next, the following description discusses, with reference to FIG. 13, a data communication system in accordance with the present invention. FIG. 13 is a block diagram illustrating how a data communication system 500 is configured. The present embodiment describes with an example in which the data transmission device and the data receiving device are a mobile phone 1 and a car navigation system 100, respectively. Needless to say, the data transmission device and the data receiving device are not limited to the mobile phone and the car navigation system, respectively, and can therefore be devices other than the mobile phone and the car navigation system.

As illustrated in FIG. 13, the data communication system 500 includes the mobile phone 1 and the car navigation system 100. Since the foregoing description discussed in detail how the mobile phone 1 is configured, the description of how the mobile phone 1 is configured is omitted here. The following description discusses only how the car navigation system 100 is configured.

(Configuration of Car Navigation System 100)

As illustrated in FIG. 13, the car navigation system 100 includes: a navigation control section 110; a transmission request transmitting section 111; an image data receiving section 112; a map information database 113; a current position detection section 114; and a display section 115. These are described as follows.

(Navigation Control Section 110)

The navigation control section 110 controls overall operations of the car navigation system 100. For example, the car navigation system 100 carries out a route search in such a manner that the navigation control section 110 (i) searches for a most appropriate route (driving route) with reference to the current position detection section 114 and the map information database 113 and (ii) controls the display section 115 to display the result of the search. Further, at a time when a communication is established between the car navigation system 100 and the mobile phone 1, the navigation control section 110 makes an instruction so that a transmission request for requesting a piece of image data is transmitted to the mobile phone 1.

(Transmission Request Transmitting Section 111)

The transmission request transmitting section 111 transmits the transmission request to the mobile phone 1 in accordance with the instruction by the navigation control section 110. Note here that the transmission request is transmitted from the transmission request transmitting section 111 via for example Bluetooth®.

(Image Data Receiving Section 112)

An image data receiving section 112 receives the piece of image data, which is transmitted from the mobile phone 1 in response to the transmission request from the car navigation system 100. Note here that a transmission medium via which the piece of image data is transmitted from the mobile phone 1 to the car navigation system 100 is for example: (i) wireless connection such as IEEE 802.11 wireless, infrared (e.g., IrDA or remote control), or Bluetooth® or (ii) a non-contact IC.

(Map Information Database 113)

The map information database 113 stores map information, with reference to which the route search is carried out.

(Current Position Detection Section 114)

The current position detection section 114 detects a current position of a vehicle by using a GPS, which is a system for determining the current position by receiving electric waves from an artificial satellite.

(Display Section 115)

The display section 115 is constituted by an image display monitor such as a liquid crystal monitor. The display section 115 displays for example the result of the route search carried out by the navigation control section 110. Note that, although FIG. 12 illustrates a configuration in which the display section 115 is included in the car navigation system 100, the configuration is not limited to this. The display section 115 can be an independent device provided separately from the car navigation system 100.

(How Car Navigation System 100 Operates when Receiving Image Data)

Figure 14:
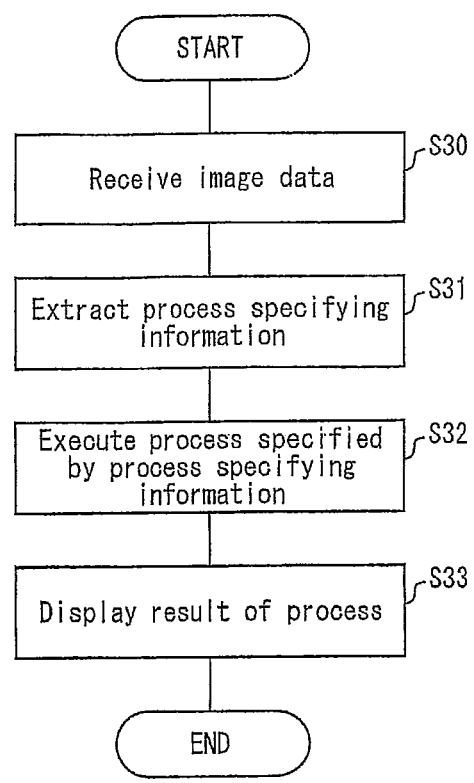
FIG. 14 is a flowchart illustrating how a car navigation system carries out processes when it has received a piece of image data.

Next, the following description discusses how the data communication system 500 operates. Note here that, since the operation of the mobile phone 1 (i.e., operation of transmitting a piece of image data) of the data communication system 500 was described earlier in detail, the description of the operation of the mobile phone 1 is omitted here. The following description discusses, with reference to FIG. 14, how the car navigation system 100 operates when it has received a piece of image data from the mobile phone 1. FIG. 14 is a flowchart illustrating how the car navigation system 100 operates when it has received the piece of image data.

First, the image data receiving section 112 receives a piece of image data from the image data transmitting section (step S30). Next, the navigation control section 110 extracts a piece of process specifying information from the piece of image data thus received (step S31). Then, the navigation control section 110 carries out a process specified by the piece of process specifying information thus extracted (step S32).

For example, in a case where the piece of process specifying information instructs position coordinates to be registered, the navigation control section 110 registers, to a memory, the position coordinates (latitude and longitude) based on GPS information which is set as a parameter of the piece of process specifying information stored in the piece of image data. In a case where the piece of process specifying information instructs a route search to be carried out, the navigation control section 110 searches for, with reference to the map information stored in the map information database 113, a most appropriate route from (i) coordinates of the current position supplied from the current position detection section 114 to (ii) the position coordinates based on the GPS information set as the parameter of the piece of process specifying information stored in the piece of image data.

Then, the navigation control section 110 controls the display section 115 to display the result of the process (step S33). For example, in a case of point registration, the result displayed on the display section 115 can be a notification indicating that the position coordinates have been subjected to memory registration. In a case of the route search, the result displayed on the display section 115 can be the most appropriate route (or a candidate for the most appropriate route) obtained through the route search.

The foregoing description discussed how the car navigation system 100 operates in a case where a final destination is the position coordinates based on the GPS information set as the parameter of the piece of process specifying information stored in the piece of image data. Note, however, that the car navigation system 100 can carry out other processes in accordance with various pieces of process specifying information. For example, the car navigation system 100 can search a route by setting a way point to the position coordinates based on the GPS information of the piece of process specifying information. Further, the car navigation system 100 can, in a case where the route search has already been completed, again carry out a route search by setting the final destination to the position coordinates based on the GPS information of the piece of process specifying information (that is, the car navigation system 100 can carry out a re-route search).

(Program and Recording Medium)

Lastly, the control section 10 of the mobile phone 1 can be implemented by hardware, or can be realized by software executed by a CPU (Central Processing Unit) as follows.

Namely, the control section 10 includes a CPU and memory devices (storage media). The CPU is for example an MPU, and executes instructions contained in programs so as to realize various functions. The memory devices may be a ROM (Read Only Memory) containing the programs, a RAM (Random Access Memory) to which the programs are loaded so that the programs are executable, or a memory containing the programs and various data.

An object of the present invention can be achieved not only by the programs fixedly stored in a program memory of the control section 10, but also by mounting, to the mobile phone 1, a computer-readable storage medium containing program code (executable programs, intermediate code programs, or source programs) for the programs, in order for the mobile phone 1 to retrieve and execute the program code contained in the storage medium.

The storage medium is not limited to any particular structure or type, and can be, for example, a tape, such as a magnetic tape or a cassette tape; a magnetic disk, such as a Floppy® disk or a hard disk, or an optical disc, such as a CD-ROM/MO/MD/DVD/CD-R; a card, such as an IC card (memory card) or an optical card; or a semiconductor memory, such as a mask ROM/EPROM/EEPROM/flash ROM.

An object of the present invention can be achieved also by configuring the control section 10 (or the mobile phone 1) such that the control section 10 is connectable to a communications network. In such a case, the program code is delivered over the communications network to the control section 10. The communications network is not limited to any particular type or form as long as the program code can be supplied to the control section 10 over the communications network, and can be, for example, the Internet, an intranet, extranet, LAN, ISDN, VAN, CATV communications network, virtual dedicated network (Virtual Private Network), telephone line network, mobile communications network, or satellite communications network.

The transfer medium constituting the communications network is not limited to any particular configuration or type as long as the program code can be delivered via the transfer medium, and can be, for example, a wired line, such as IEEE 1394, USB, an electric power line, a cable TV line, a telephone line, or an ADSL (Asymmetric Digital Subscriber Line); or wireless, such as infrared (IrDA, remote control), Bluetooth®, 802.11 wireless, HDR, a mobile telephone network, a satellite line, or a terrestrial digital network. The present invention can be realized also by the program code in the form of a computer data signal embedded in a carrier wave which is embodied by electronic transmission.

The foregoing description specifically discussed the present invention on the basis of the embodiments. Note, however, that the present invention is not limited to the embodiments above, but may be altered within the scope of the claims. An embodiment based on a proper combination of technical means disclosed in different embodiments is encompassed in the technical scope of the present invention.

INDUSTRIAL APPLICABILITY

A data transmission device in accordance with the present invention is widely applicable to devices such as portable information terminals, for example not only a mobile phone but also a portable gaming device or a PDA.

REFERENCE SIGNS LIST

1 Mobile phone (Data transmission device)
3 Image data (Additional-information-containing data)
5 Process specifying information
10 Control section (Process item setting means, Determining means, Item setting means)
11 Transmission request receiving section
12 Image data transmitting section (Transmitting means)
13 Display control section
14 Display section
15 Operation input section
16 Image data receiving section (Additional-information-containing data receiving means)
20 Search section (Detecting means)
21 Transmission setting section
22 Storage information identification section (Identification means)
50 Transmission setting management database (Transmission setting management section)
51 Image data database (Data storage section)
100 Car navigation system (Data receiving device)
110 Navigation control section (Process executing means)
111 Transmission request transmitting section
112 Image data receiving section (Receiving means)
113 Map information database
114 Position detection section
115 Display section
500 Data communication system

The invention claimed is:

1. A data transmission device for transmitting a piece of additional-information-containing data in which pieces of process specifying information for causing a data receiving device to carry out a specified process are stored,
said data transmission device, comprising:
a transmission setting management section;
transmission setting means for registering, on the transmission setting management section, a piece of additional-information-containing data to be transmitted to the data receiving device; and
transmitting means for transmitting, to the data receiving device, the piece of additional-information-containing data registered on the transmission setting management section,
the transmitting means transmitting the piece of additional-information-containing data to the data receiving device (i) in response to a transmission request received from the data receiving device or (ii) at a time when a communication is established between the data transmission device and the data receiving device, and
the pieces of process specifying information including (a) a first piece of information indicative of a command specifying a process to be carried out by the data receiving device and (b) a second piece of information indicative of a parameter with reference to which the data receiving device carries out the process, wherein:
the transmission setting means registers, on the transmission setting management section, the piece of additional-information-containing data such that the piece of additional-information-containing data is associated with a transmission time period of the piece of additional-information-containing data; and
the piece of additional-information-containing data which is transmitted by the transmitting means to the data receiving device is registered on the transmission setting management section so as to be associated with the transmission time period including a time when the transmission request is received or a time when a communication is established between the data transmission device and the data receiving device.

2. The data transmission device according to claim 1, wherein, after the piece of additional-information-containing data is transmitted to the data receiving device, the transmission setting means (i) deletes, from the transmission setting management section, the piece of additional-information-containing data which has been transmitted or (ii) registers information, indicating that the piece of additional-information-containing data has been transmitted, on the transmission setting management section such that the information is associated with the piece of additional-information-containing data which has been transmitted.

3. A data transmission device according to claim 1, further comprising:
determining means for determining whether or not it is possible to transmit a piece of additional-information-containing data to the data receiving device,
the transmission setting means registering the piece of additional-information-containing data on the transmission setting management section if it is determined by the determining means that it is not possible to transmit the piece of additional-information-containing data to the data receiving device.

4. A data transmission device according to claim 1, further comprising:
a display section;
determining means for determining whether or not it is possible to transmit a piece of additional-information-containing data to the data receiving device;
item setting means for setting an item to be displayed on the display section; and
display controlling means for controlling the display section to display the item set by the item setting means,
the item set by the item setting means being, (i) in a case where it is determined by the determining means that it is possible to transmit the piece of additional-information-containing data to the data receiving device, at least one of (a) an item for causing the piece of additional-information-containing data to be immediately transmitted and (b) an item for causing the piece of additional-information-containing data to be registered on the transmission setting management section or (ii) in a case where it is determined by the determining means that it is not possible to transmit the piece of additional-information-containing data to the data receiving device, the item for causing the piece of additional-information-containing data to be registered on the transmission setting management section.

5. The data transmission device according to claim 1, wherein:
the transmission setting means registers, on the transmission setting management section, the piece of additional-information-containing data such that the piece of additional-information-containing data is further associated with a transmission medium via which the piece of additional-information-containing data is to be transmitted; and
the transmitting means transmits the piece of additional-information-containing data via the transmission medium associated with the piece of additional-information-containing data.

6. The data transmission device according to claim 5, wherein the transmission setting means determines, in accordance with the pieces of process specifying information stored in the piece of additional-information-containing data, the transmission medium registered on the transmission setting management section so as to be associated with the piece of additional-information-containing data.

7. The data transmission device according to claim 1, wherein, in a case where (i) a first transmission time period of a first one of the pieces of additional-information-containing data which has been registered on the transmission setting management section and (ii) a second transmission time period of a second one of the pieces of additional-information-containing data which is intended to be registered on the transmission setting management section, overlap each other, the transmission setting means registers the first and second ones of the pieces of additional-information-containing data such that the first and second ones of the pieces of additional-information-containing data are associated with their orders in which they are transmitted.

8. A data transmission device according to claim 1, further comprising:
a data storage section; and
additional-information-containing data receiving means for receiving a piece of additional-information-containing data and for storing received pieces of additional-information-containing data in the data storage section,
the transmission setting means registering, as the piece of additional-information-containing data to be transmitted to the data receiving device, a selected one of the pieces of additional-information-containing data stored in the data storage section on the transmission setting management section.

9. A data transmission device according to claim 1, further comprising:
a display section;
process item setting means for setting, in accordance with a type of each of the pieces of process specifying information stored in the piece of additional-information-containing data, an item which the data transmission device can process; and
display controlling means for controlling the display section to display the item set by the process item setting means.

10. The data transmission device according to claim 1, wherein the piece of additional-information-containing data is a piece of image data which stores a piece of process specifying information with the parameter, the piece of process specifying information causing the data receiving device to carry out a specified process.

11. A data transmission device according to claim 1, further comprising:
a display section; and
display controlling means for controlling the display section to display the piece of additional-information-containing data,
the display controlling means controlling the display section to display a piece of additional-information-containing data on which a piece of identification information, indicating that the piece of additional-information-containing data stores its piece of process specifying information, is superimposed.

12. The data transmission device according to claim 11, wherein the piece of identification information varies depending on a type of the piece of process specifying information.

13. The data transmission device according to claim 10, wherein:
the data receiving device is a car navigation system; and
the parameter causes the car navigation system to carry out a specified process that can be carried out by the car navigation system.

14. The data transmission device according to claim 13, wherein the parameter is a parameter which causes the car navigation system to (i) search for a route to a target point or (ii) register the target point.

15. A data communication system, comprising:
a data receiving device for receiving a piece of additional-information-containing data in which pieces of process specifying information for causing a specified process to be carried out are stored; and a data transmission device for transmitting the piece of additional-information-containing data to the data receiving device, the pieces of process specifying information including (i) a first piece of information indicative of a command specifying a process to be carried out by the data receiving device and (ii) a second piece of information indicative of a parameter with reference to which the data receiving device carries out the process, the data transmission device including:

a transmission setting management section;

transmission setting means for registering, on the transmission setting management section, the piece of additional-information-containing data to be transmitted to the data receiving device; and transmitting means for transmitting, to the data receiving device, the piece of additional-information-containing data registered on the transmission setting management section, the transmitting means transmitting the piece of additional-information-containing data to the data receiving device (i) in response to a transmission request received from the data receiving device or (ii) at a time when a communication is established between the data transmission device and the data receiving device, wherein:

the transmission setting means registers, on the transmission setting management section, the piece of additional-information-containing data such that the piece of additional-information-containing data is associated with a transmission time period of the piece of additional-information-containing data; and the piece of additional-information-containing data which is transmitted by the transmitting means to the data receiving device is registered on the transmission setting management section so as to be associated with the transmission time period including a time when the transmission request is received or a time when a communication is established between the data transmission device and the data receiving device, and the data receiving device including:

transmission request transmitting means for transmitting, to the data transmission device, the transmission request for requesting the data transmission device to transmit the piece of additional-information-containing data;

receiving means for receiving the piece of additional-information-containing data transmitted from the data transmission device which has received the transmission request; and means for carrying out the process specified by the command indicated by the pieces of process specifying information stored in the piece of additional-information-containing data with reference to the parameter indicated by the pieces of process specifying information.

16. The data communication system according to claim 15, wherein:

the data transmission device is a portable information terminal; and the data receiving device is a car navigation system.

17. A data transmission method for use in a data transmission device for transmitting a piece of additional-information-containing data in which pieces of process specifying information for causing a data receiving device to carry out a specified process are stored, said data transmission method, comprising the steps of:

registering, on a transmission setting management section, a piece of additional-information-containing data to be transmitted to the data receiving device; and transmitting, to the data receiving device, the piece of additional-information-containing data registered on the transmission setting management section, in the transmitting, the piece of additional-information-containing data being transmitted to the data receiving device (i) in response to a transmission request received from the data receiving device or (ii) at a time when a communication is established between the data transmission device and the data receiving device, and the pieces of process specifying information including (i) a first piece of information indicative of a command specifying a process to be carried out by the data receiving device and (i) a second piece of information indicative of a parameter with reference to which the data receiving device carries out the process, wherein:

the registering further includes registering, on the transmission setting management section, the piece of additional-information-containing data such that the piece of additional-information-containing data is associated with a transmission time period of the piece of additional-information-containing data; and the piece of additional-information-containing data which is transmitted to the data receiving device is registered on the transmission setting management section so as to be associated with the transmission time period including a time when the transmission request is received or a time when a communication is established between the data transmission device and the data receiving device.

18. A computer-readable recording medium in which a program for causing a computer included in a data transmission device recited in claim 1 to operate is stored, said program causing the computer to function as the means recited in the data transmission device.

* * * * *